(12) United States Patent
Bradley

(10) Patent No.: US 8,113,473 B2
(45) Date of Patent: Feb. 14, 2012

(54) T-POST AND OTHER MOUNTING SYSTEMS AND ACCESSORIES

(76) Inventor: Seldon Bradley, Zionsville, IN (US)

( * ) Notice: Subject to any disclaimer, the term of this patent is extended or adjusted under 35 U.S.C. 154(b) by 404 days.

(21) Appl. No.: 11/644,530

(22) Filed: Dec. 22, 2006

(65) Prior Publication Data

US 2008/0149786 A1 Jun. 26, 2008

(51) Int. Cl.
*F16L 3/00* (2006.01)
*E04H 17/00* (2006.01)

(52) U.S. Cl. .......... 248/121; 248/545; 256/1; 174/158 F

(58) Field of Classification Search ................. 248/121, 248/127, 511, 519, 530, 545, 177.1, 218.4, 248/219.2; 52/101; 256/65.02, 32, 47, 40, 256/44, 1; 174/158 F
See application file for complete search history.

(56) References Cited

U.S. PATENT DOCUMENTS

| | | | | |
|---|---|---|---|---|
| 2,138,977 A * | 12/1938 | Mathews | ...................... | 248/146 |
| 2,195,072 A * | 3/1940 | Bauer | ........................ | 256/65.03 |
| 2,291,170 A | 7/1942 | Moths | | |
| 3,670,468 A * | 6/1972 | Cordell, Sr. | ..................... | 52/298 |
| 3,818,868 A * | 6/1974 | Boehland, Jr. | ................ | 119/431 |
| 3,865,309 A * | 2/1975 | Greenhalgh | .................. | 239/268 |
| 4,520,231 A | 5/1985 | Hubbell | | |
| 4,623,756 A * | 11/1986 | Wilson, Jr. | ................ | 174/158 F |
| 4,680,428 A | 7/1987 | Wilson, Jr. | | |
| 4,979,724 A * | 12/1990 | Williams | ........................ | 256/36 |
| 5,085,409 A | 2/1992 | Teixeira | | |
| 5,104,074 A * | 4/1992 | Malloy | ........................ | 248/156 |
| 5,332,196 A * | 7/1994 | Wright | ............................. | 256/47 |
| 5,356,101 A * | 10/1994 | Malloy | ........................ | 248/156 |
| 5,593,143 A * | 1/1997 | Ferrarin | ........................... | 256/68 |
| 5,653,546 A | 8/1997 | Cronkhite et al. | | |
| 5,664,748 A * | 9/1997 | Speece et al. | ............... | 248/219.2 |
| 5,685,343 A * | 11/1997 | Smith | ............................. | 138/89 |
| 5,692,454 A * | 12/1997 | Testa | ........................... | 119/69.5 |
| 5,731,895 A | 3/1998 | Owczarzak et al. | | |
| 5,755,431 A * | 5/1998 | Williams | ........................ | 256/19 |
| 6,286,450 B1 * | 9/2001 | Murrin et al. | ................. | 116/209 |
| 6,330,998 B1 | 12/2001 | Roy | | |
| 6,394,228 B1 | 5/2002 | Stephens et al. | | |
| 6,543,750 B1 | 4/2003 | Calzone | | |
| 6,612,551 B1 | 9/2003 | Roy | | |
| 6,619,627 B2 | 9/2003 | Salisbury et al. | | |
| 6,622,436 B1 * | 9/2003 | Kretsch | ........................ | 52/101 |
| 6,691,479 B1 | 2/2004 | Tscharner | | |
| 6,960,728 B1 | 11/2005 | Halderman | | |
| D554,777 S * | 11/2007 | Roy | ............................. | D25/133 |
| 2004/0016915 A1 | 1/2004 | Wood | | |
| 2005/0127259 A1 | 6/2005 | Riker | | |
| 2006/0027796 A1 | 2/2006 | O'Connor | | |

OTHER PUBLICATIONS

Fencing Solutions, http://www.fencingsolutions.com/Descriptions.htm#Eqi-Tee%20Adapter, last printed Mar. 13, 2006, 1 page.
Fencing Solutions, http://www.fencingsolutions.com/index.htm, last printed Mar. 13, 2006, Equi-Tee Farm & Fence, 3pages.

* cited by examiner

*Primary Examiner* — Anita M King
(74) *Attorney, Agent, or Firm* — Woodard, Emhardt, Moriarty, McNett & Henry, LLP

(57) ABSTRACT

Described in certain embodiments are mounting systems that employ one or more T-posts to support useful implements such as birdhouses, signs, fencing, banners, and the like. Additional disclosed embodiments relate to unique post- or wall-mount systems for such implements.

37 Claims, 31 Drawing Sheets

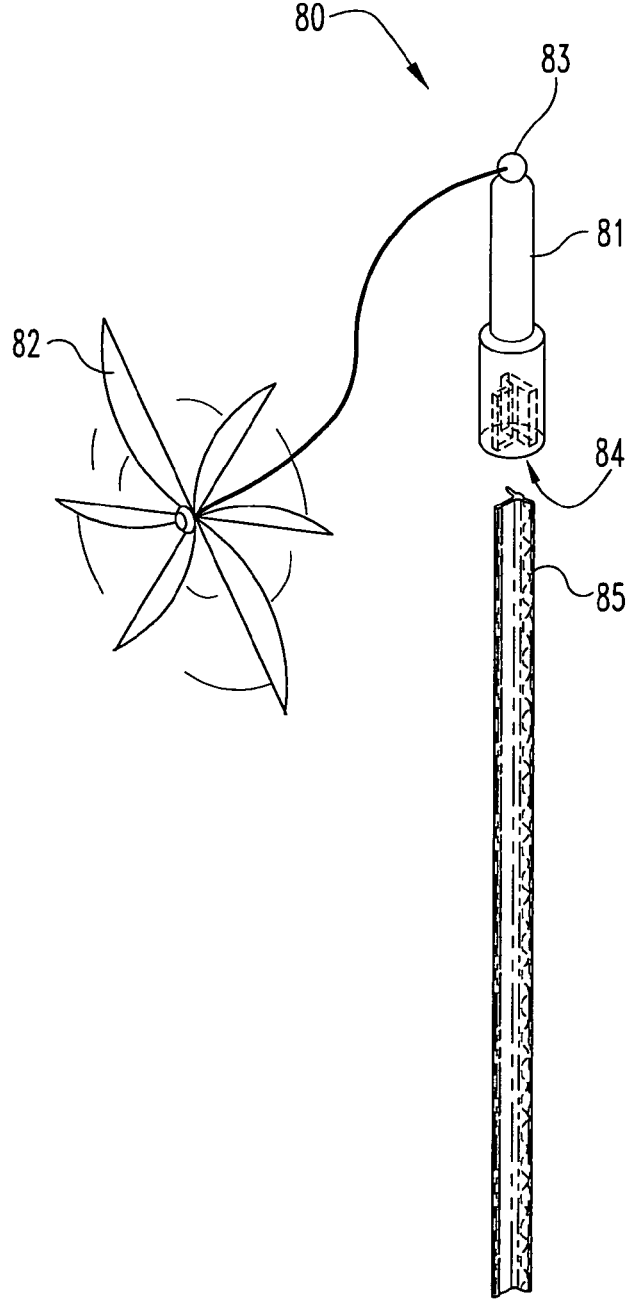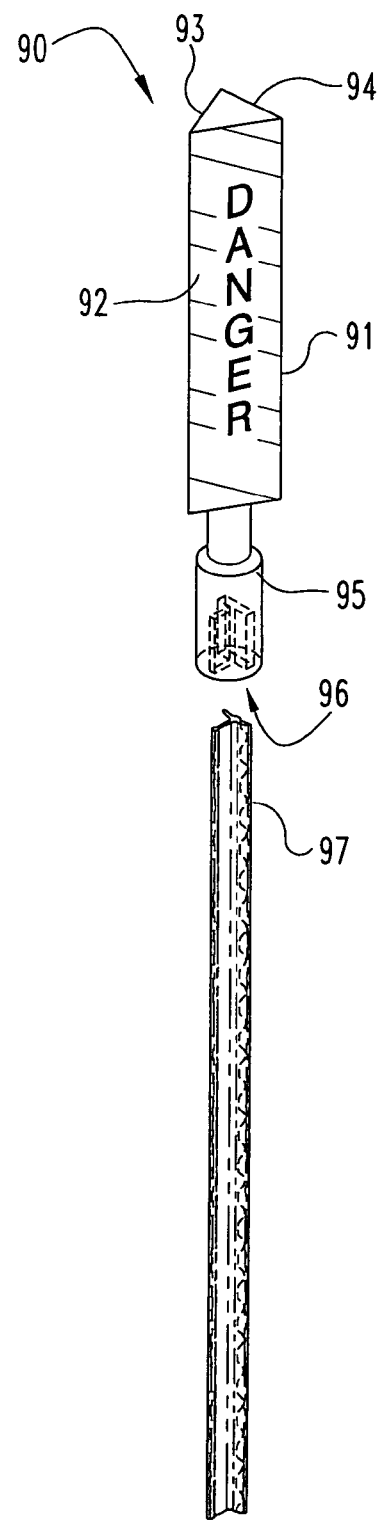
*Fig. 6*     *Fig. 7*

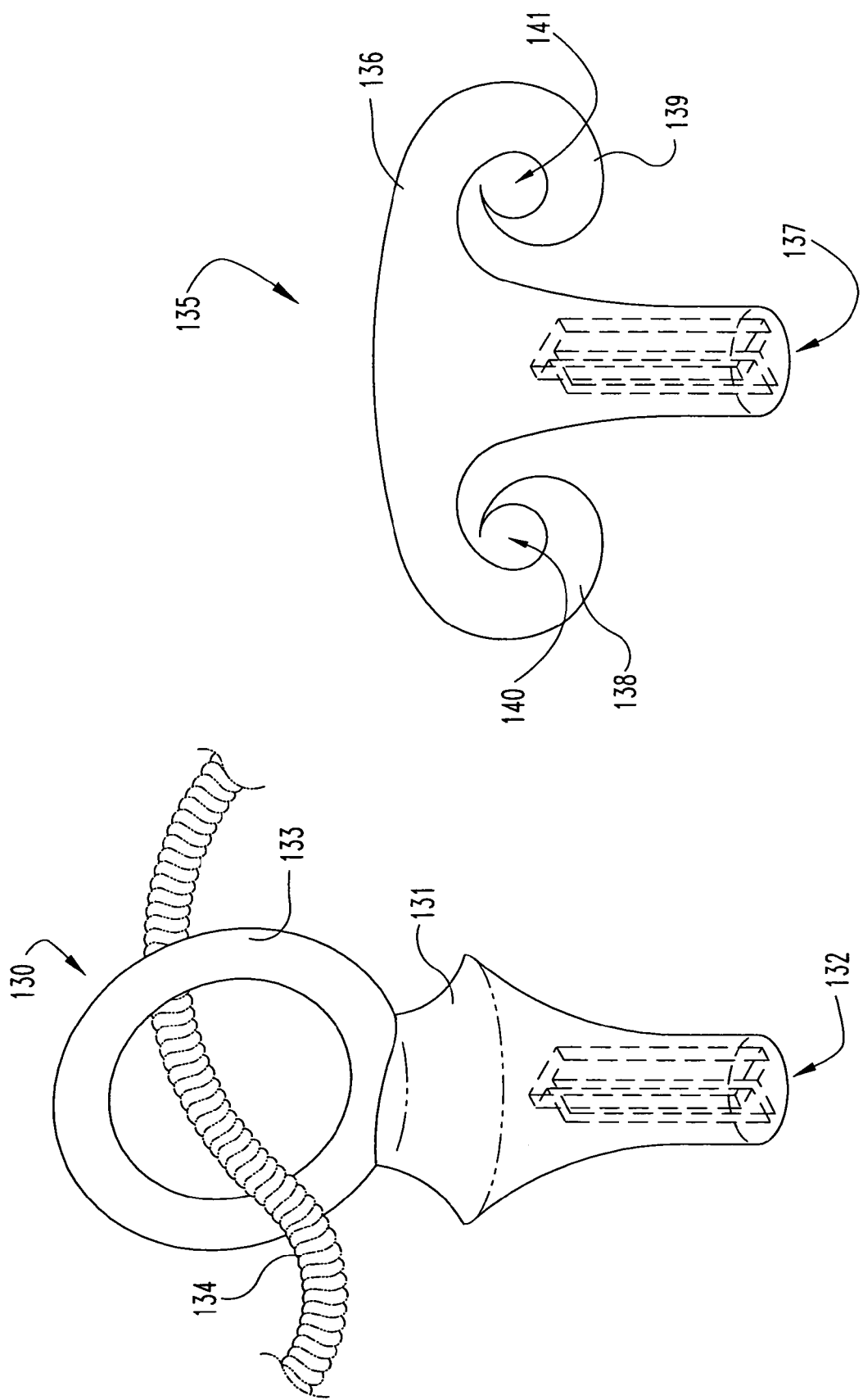

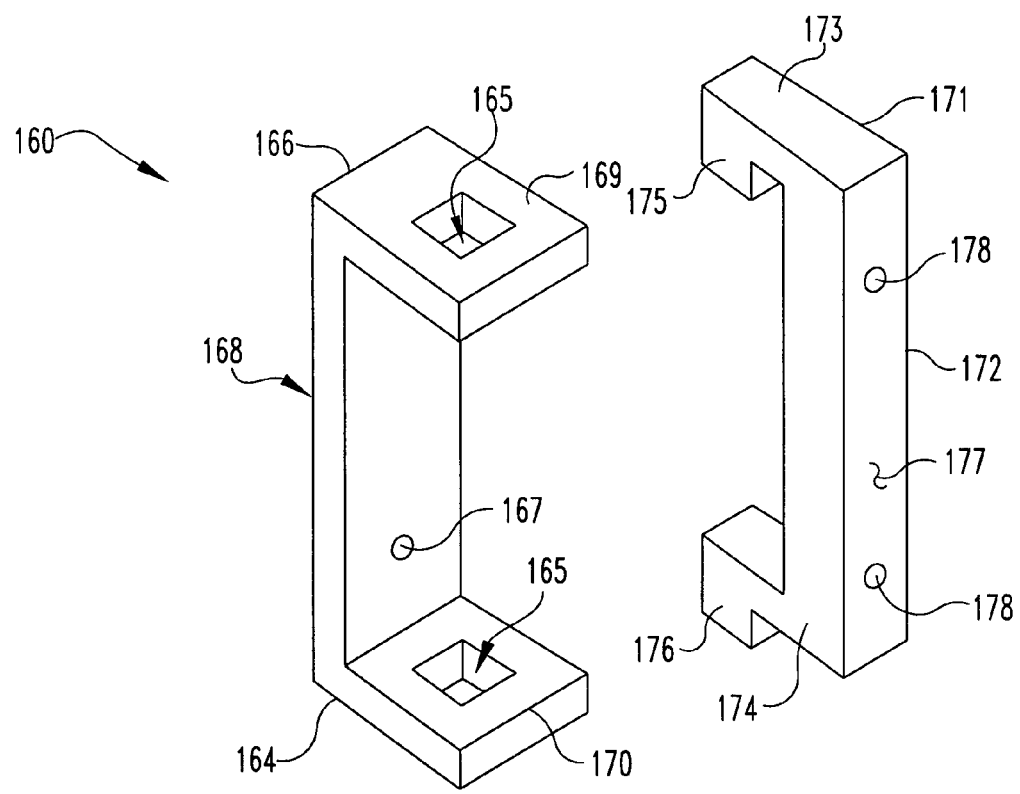
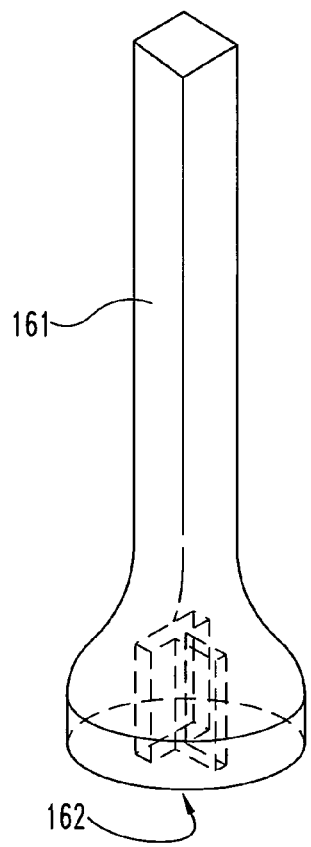
Fig. 13

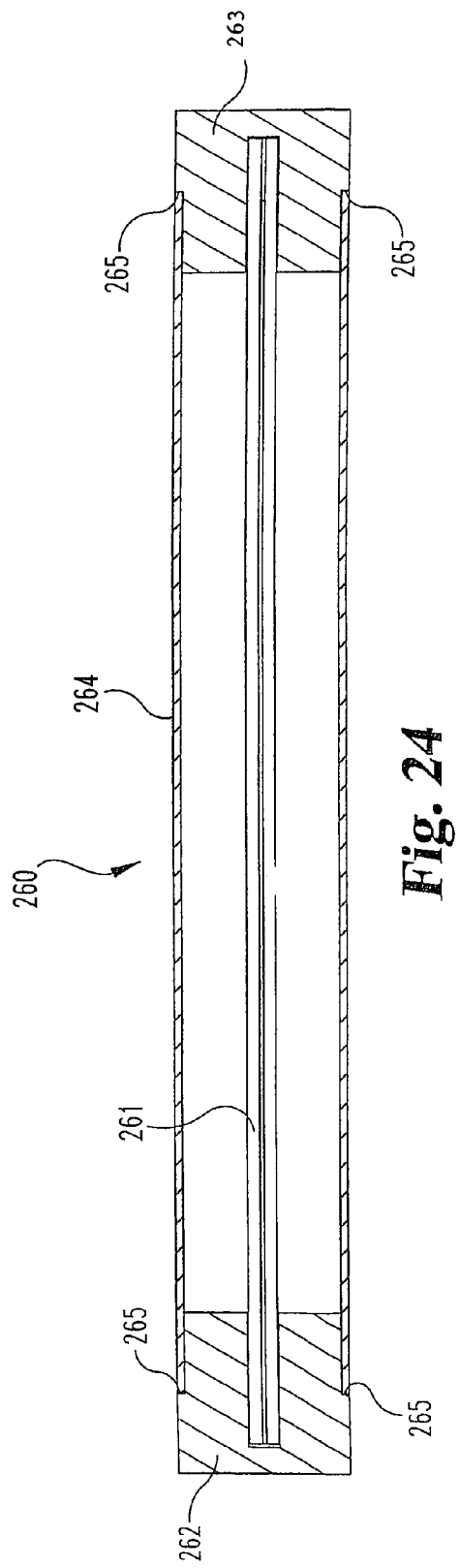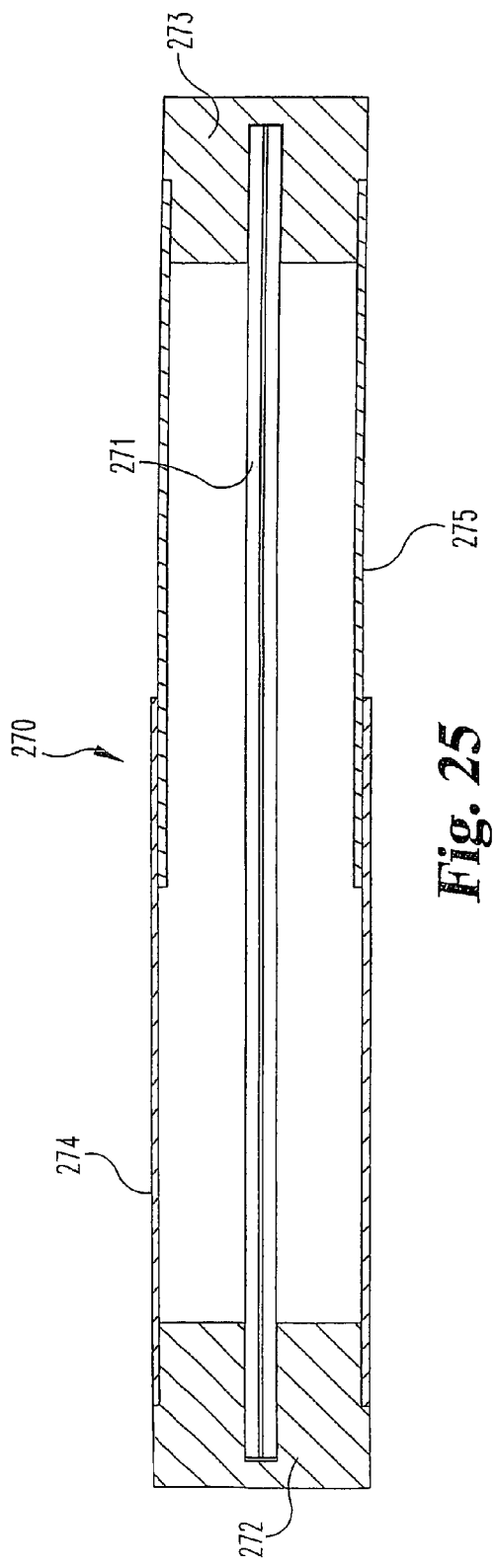

T-POST AND OTHER MOUNTING SYSTEMS AND ACCESSORIES

BACKGROUND

The present invention relates generally to systems for mounting useful implements such as birdhouses, mailboxes, and signage, and in certain of its aspects to such systems which utilize post structures, and especially T-posts.

As further background, the need often arises to mount useful objects such as in residential, commercial, public, or other environments. Available mounting systems have flaws ranging from high end units that are overly complex and expensive to low end units that, while being inexpensive, offer inadequate stability. On the other hand, T-posts, including studded steel T-posts, are sturdy, relatively easy to install, manufactured in large numbers, and relatively inexpensive. Nonetheless, the adoption of T-post based mounting systems has been quite limited, perhaps due to their unrefined appearance and the unavailability of acceptable designs for supporting structures on or by T-posts.

In another area with which certain aspects of the invention are concerned, select few individuals mount birdhouses in or around their residences or commercial buildings, despite the fact that much natural bird habitat is being destroyed by residential and commercial development. In many instances, this may be due to a lack of satisfactory commercial products for mounting birdhouses. Needs therefore exist for improved and convenient systems for mounting birdhouses so that their numbers and use can increase.

In still other areas in which the present invention is concerned, increasing usages of signs, fencing and other implements drives needs for improved or alternative support systems.

These and other needs are addressed by various aspects of the present invention.

SUMMARY

In certain of its embodiments, the present invention provides unique accessories for and uses of T-posts. These inventive embodiments include, for example, improved mating configurations for accessories to be mounted atop T-posts, multi-purpose mount accessories for receipt atop T-posts, T-post mounted accessories with novel structural and functional features such as rope holders and lateral support members for supporting adjacent objects, unique birdhouse systems with T-post mounting, T-post based fence constructions, and systems and accessories involving the use of multiple associated T-posts to support vertical and/or lateral loads.

In additional embodiments of the invention, support systems and accessories are provided that can utilize T-posts supports or other post or wall-mounted support structures. These include, as examples, post-mounted systems including top-mounted cap, sleeve and footing elements, post-mounted spinner devices, post-mounted banner systems, and post mounting systems including a top-mounted element in combination with a removable secondary mounting element, as well as corresponding wall mounting systems including a first element mountable on a wall and a removable second element co-operable with the wall-mounted element.

Additional embodiments of the invention as well as features and advantages thereof will be apparent from the descriptions herein.

BRIEF DESCRIPTION OF THE FIGURES

FIG. 6 provides a perspective view of a T-post mounted spinning device of the invention.

FIG. 7 provides a perspective view of a T-post mounted sign of the invention.

FIG. 10 provides a perspective view of a T-post mounted rope holder of the invention.

FIG. 11 provides a perspective view of a T-post mounted dual rope holder of the invention.

FIG. 13 provides a perspective view illustrating post-mounted and/or wall-mounted support systems of the invention including first and second cooperating elements.

FIG. 24 illustrates a T-post reinforced cross-board that can be used in the fencing system of FIG. 20.

FIG. 25 illustrates a telescoping cross-board that can be used in the fencing system of FIG. 20.

DETAILED DESCRIPTION

Figure 1:
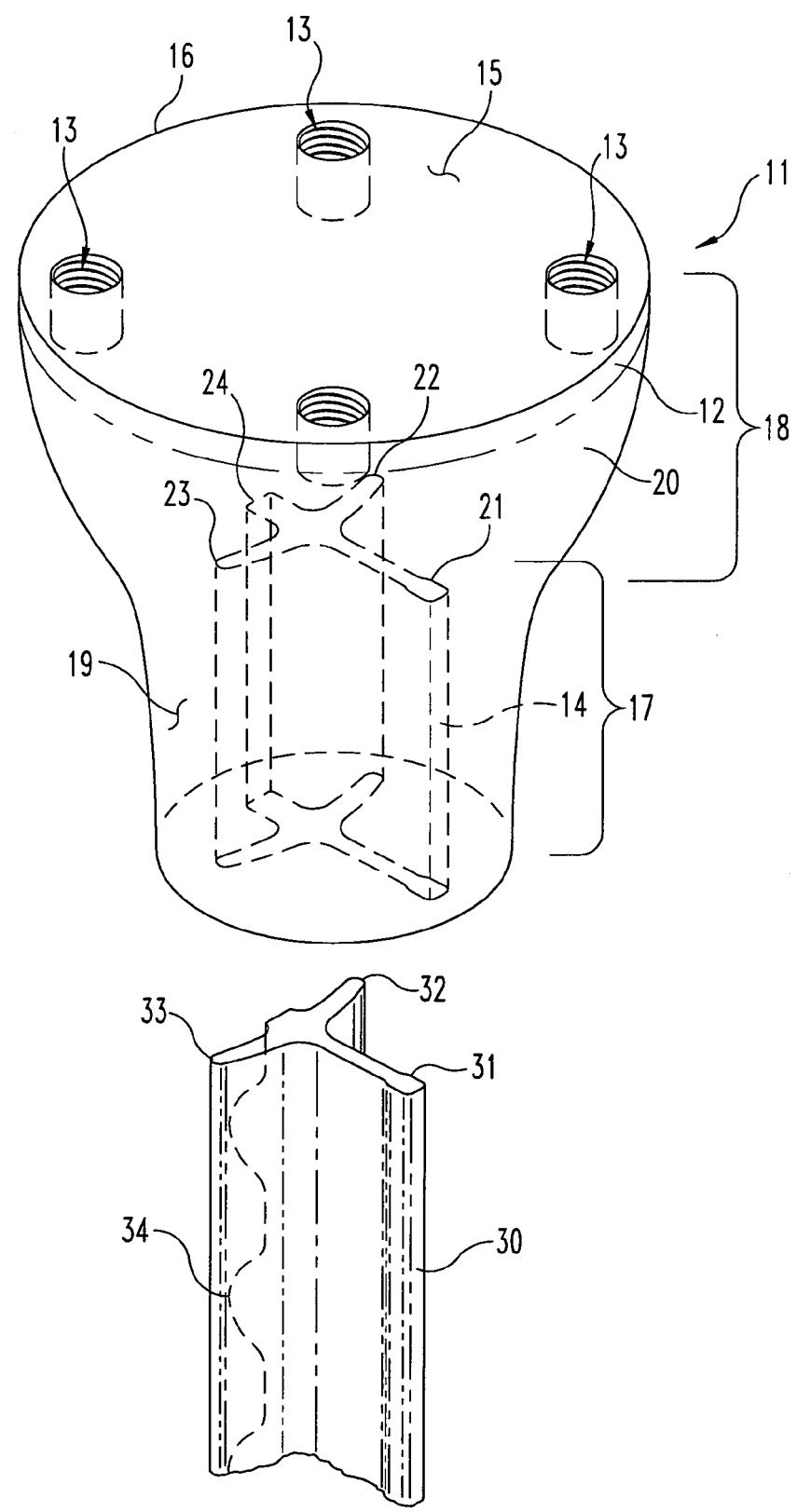
FIG. 1 provides a perspective view of a universal mount plate for receipt atop a T-post.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

With reference now to FIG. 1, shown is one embodiment of a multi-purpose mounting plate 11 of the invention. Mounting plate 11 includes a generally solid body 12 having a plurality of mounting apertures 13 in an upper surface thereof, optionally threaded as shown. Body 12 defines an internal void 14 opening to a lower surface thereof, which is sized and shaped for receiving an upper end of a T-post 30 in such a fashion as to securely mount body 12 on T-post 30.

Body 12 also includes an upper bearing surface 15 in which mounting apertures 13 are defined. Upper bearing surface 15 includes a generally circular perimeter 16, although other regular or irregular shapes such as squares, triangles, hexagons, and the like, will also be suitable. In the illustrated embodiment, body 12 includes a first portion 17 for mounting upon the T-post 30, and a second portion 18 defining upper mounting surface 15 and apertures 13. In preferred embodiments, T-post mounting portion 17 is formed as an integral piece with a solid cross-section apart from void 14 defined therein. In this manner, a sturdy, stable and lasting engagement of T-post 30 can be achieved. In the illustrated embodiment, mounting plate 11 includes an outer surface 19 of T-post mounting portion 17 which tapers to a larger diameter 20 of upper portion 18.

Internal void 14 is configured for association with a T-post, and includes a first longer void portion 21 for mating with longer leg 31 of T-post 30, two intermediate sized void portions 22 and 23 for mating, respectively, with leg portions 32 and 33 of T-post 30, and a fourth void portion 24 sized to receive spines 34 of T-post 30.

Figure 2:
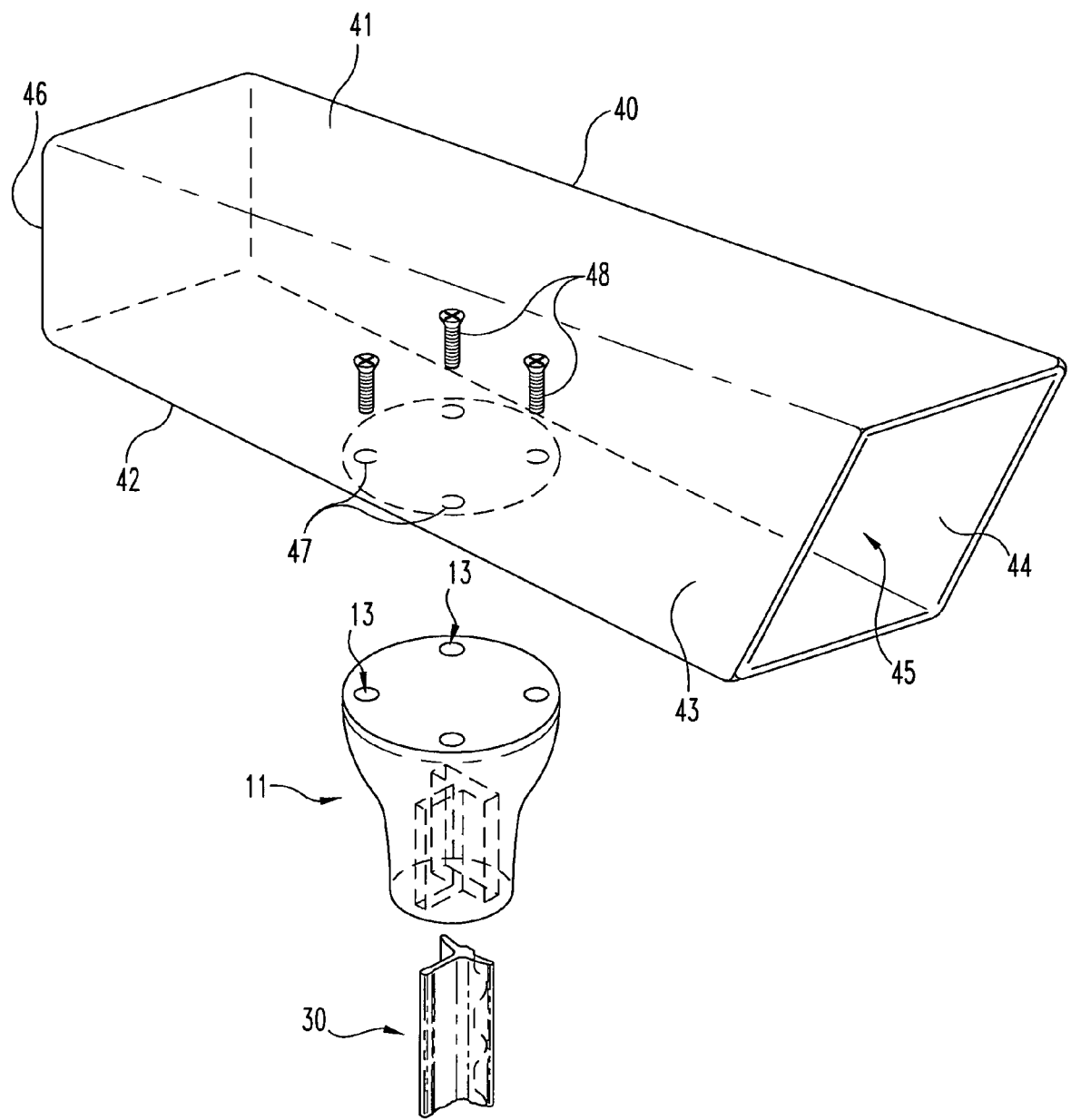
FIG. 2 provides a perspective view of the mount plate of FIG. 1 in use to support a mail or paper box.

With reference now to FIG. 2, shown is a mount plate 11 as in FIG. 1 in use to support a useful accessory, in the illustrated case the accessory being a box or container structure 40. Box or container structure 40 can be designed as a mailbox or newspaper box, and can include an upper wall 41, a lower wall 42, and side walls 43 and 44 extending therebetween. Box 40 in the illustrated embodiment also includes a frontal opening 45 and a rear wall 46. Apertures 47 are defined within lower wall 42 of box 40 and are in registry with apertures 13 of mounting plate 11. In this fashion, bolts 48 or other suitable connectors can be utilized to secure box 40 to mounting plate 11 which in turn is mounted upon T-post 30.

Figure 3:
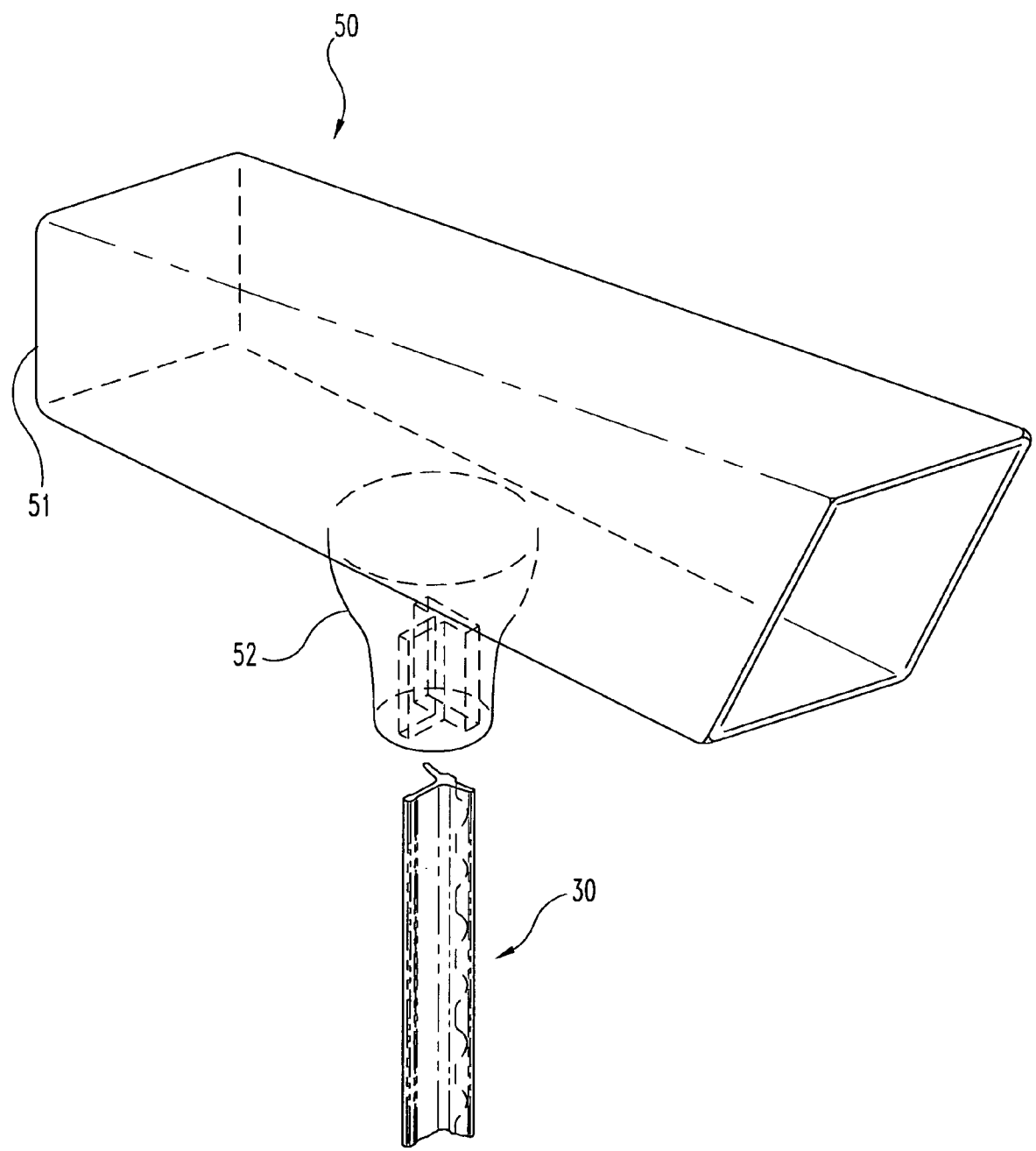
FIG. 3 provides a perspective view of a mail or paper box with an integrated T-post mount element.

With reference to FIG. 3, illustrated is another embodiment of the invention in which a T-post mounted system 50 includes a box or container 51 having a downwardly depending mount element 52 integrally formed or bonded thereto. In this manner, the use of bolts or other fasteners in mounting box 51 to T-post 30 can be avoided.

Figure 4:
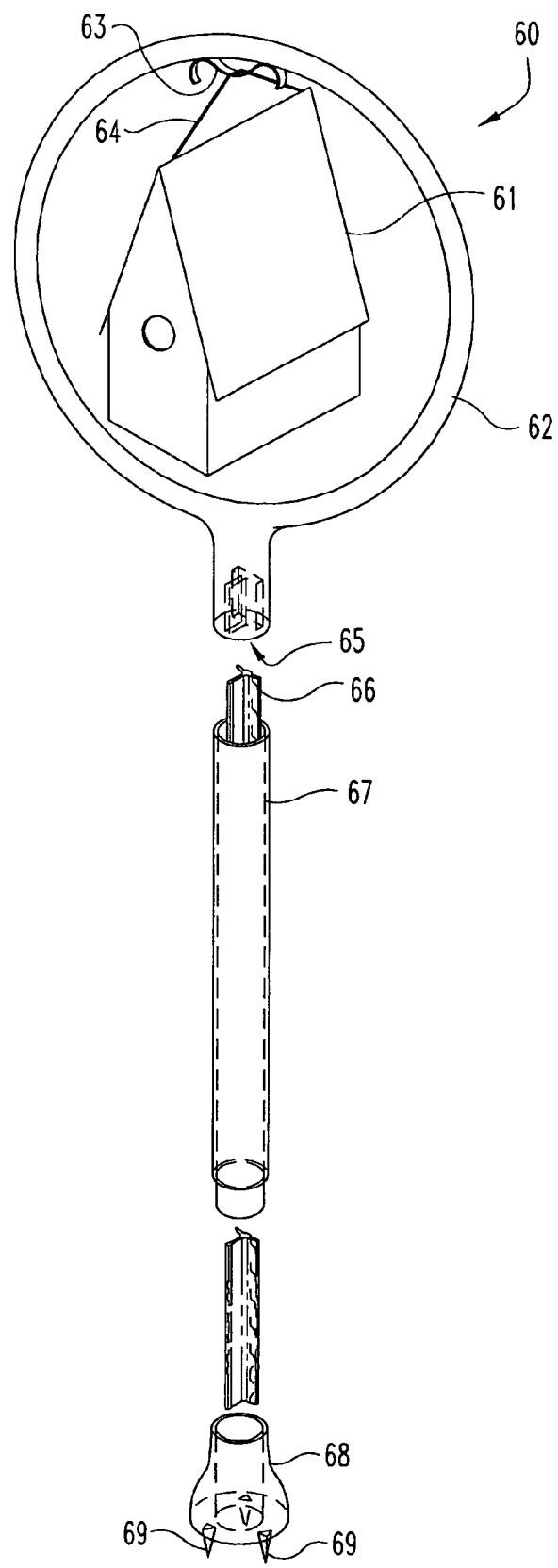
FIG. 4 provides a perspective view of a T-post mounted birdhouse and support system of the invention.

Referring now to FIG. 4, shown is a T-post mounted system 60 of the invention for supporting a birdhouse. In particular, system 60 includes a birdhouse structure 61 and an upstanding loop structure 62 within which birdhouse structure 61 is supported. In the illustrated embodiment, loop structure 62 has a retaining member 63 supported thereon, from which birdhouse structure 61 is supported with a supporting element 64. In the illustrated embodiment, supporting element 64 is shown as an elongate string or wire. It will be understood that other supporting elements such as hooks, snaps, or other attachments can also be used within the spirit and scope of the present invention.

Loop structure 62 is connected to a downwardly depending collar portion having an internal void 65 defined therein and configured to snugly mate with the top end of a T-post 66. System 60 further includes a sleeve element 67 covering T-post 66, as well as a footing element 68 mateable with sleeve element 67 and also including protruding member 69 for engaging within the ground in which T-post 66 is received. In this fashion, footing element 68 with spikes, barbs, or other protrusion 69 can serve to stabilize the overall accessory system and prevent rotation of sleeve 67 in situations wherein sleeve 67 does not have internal voids which conform to the T-post or otherwise interact with the T-post to resist rotation.

Figure 5:
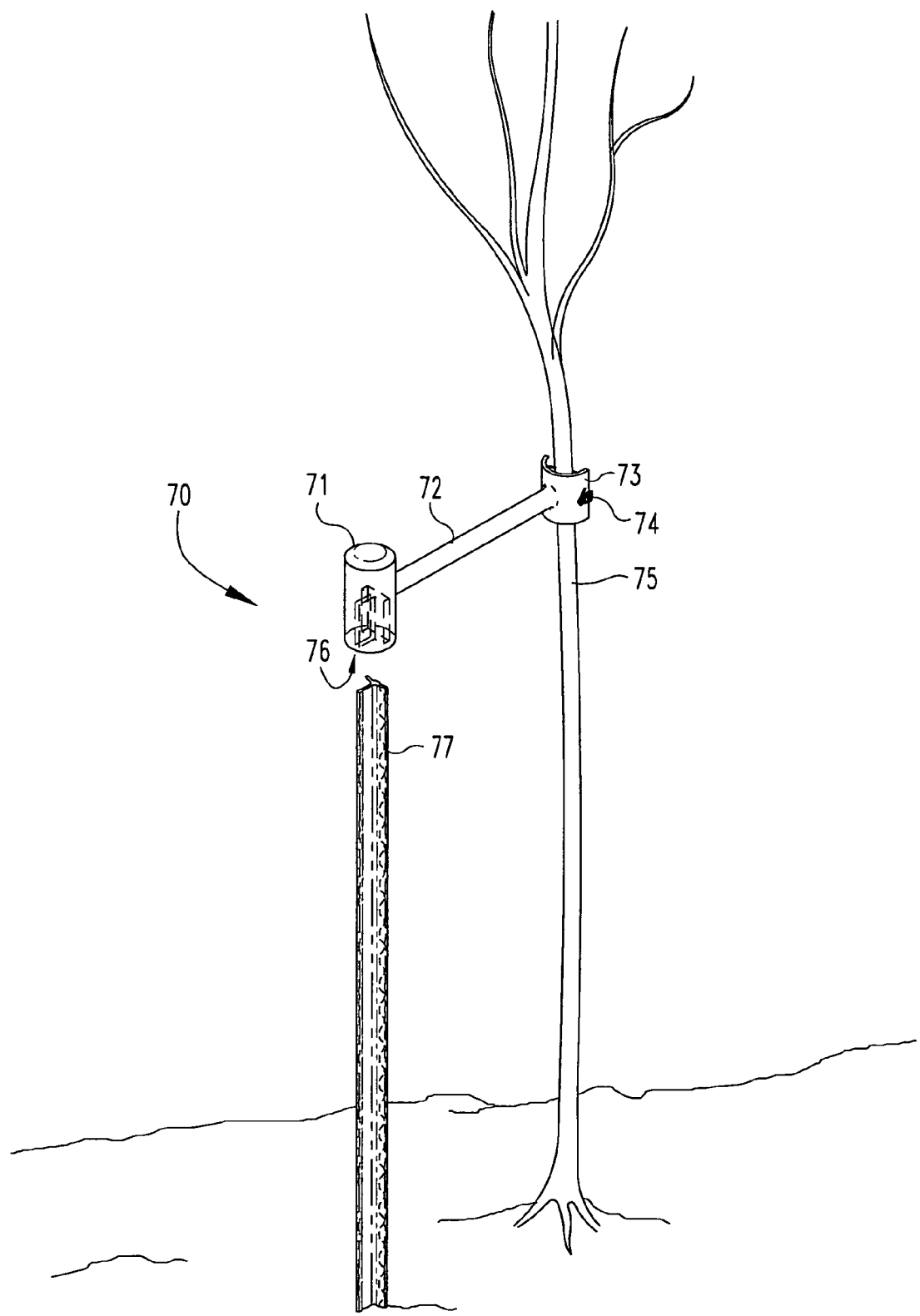
FIG. 5 provides a perspective view of a T-post mounted tree support system of the invention.

With reference to FIG. 5, shown is another T-post mounted system 70 of the invention. System 70 is designed to utilize a T-post 77 to stabilize an adjacent structure. System 70 includes a top-mounted collar element 71 having a lateral arm 72 extending therefrom and a T-post-receiving aperture 76. Engaging portion 73 is supported at the end of lateral arm 72 and can as in the illustrated embodiment define an inner region into which a tree 75 or other adjacent structure can be received. System 70 can also include a tethering element 74 or other element cooperable with engaging portion 73 to enable portions of system 70 to fully encompass tree 75 or another similar structure to be supported. It will be understood that if desired, sleeve and footing elements as shown in the system of FIG. 4 can be provided in the system of Fig . 5.

Referring now to FIGS. 6 and 7, shown are additional T-post mounted systems of the invention. In particular, shown in FIG. 6 is a decorative or amusement system 80 that includes a support component 81 mountable on T-post 85 and an element 82 depending therefrom configured to be impelled to motion upon impingement by wind or other moving air streams. Element 82 can, as illustrated, be a fan having a plurality of blades. Element 82 is rotatably connected to support 81 by a flexible wire, string or other filament 83. Support 81 includes an internal void 84 configured to mate with T-post 85. Referring to FIG. 7, shown is system 90 configured as a sign and/or reflector. System 90 includes an upstanding sign and/or reflector portion 91 which in the illustrated embodiment defines a triangular profile including a first surface 92, a second surface 93, and a third surface 94, some or all of which can carry the same or different messages and/or reflective qualities. Sign portion 91 includes a downwardly depending collar 95 having a void 96 defined therein sized and shaped to snugly mate with T-post 97. With systems 80 and 90 illustrated in FIGS. 6 and 7, respectively, it will be understood that sleeve and footing elements as illustrated in FIG. 4 could be included as well.

Figure 8:
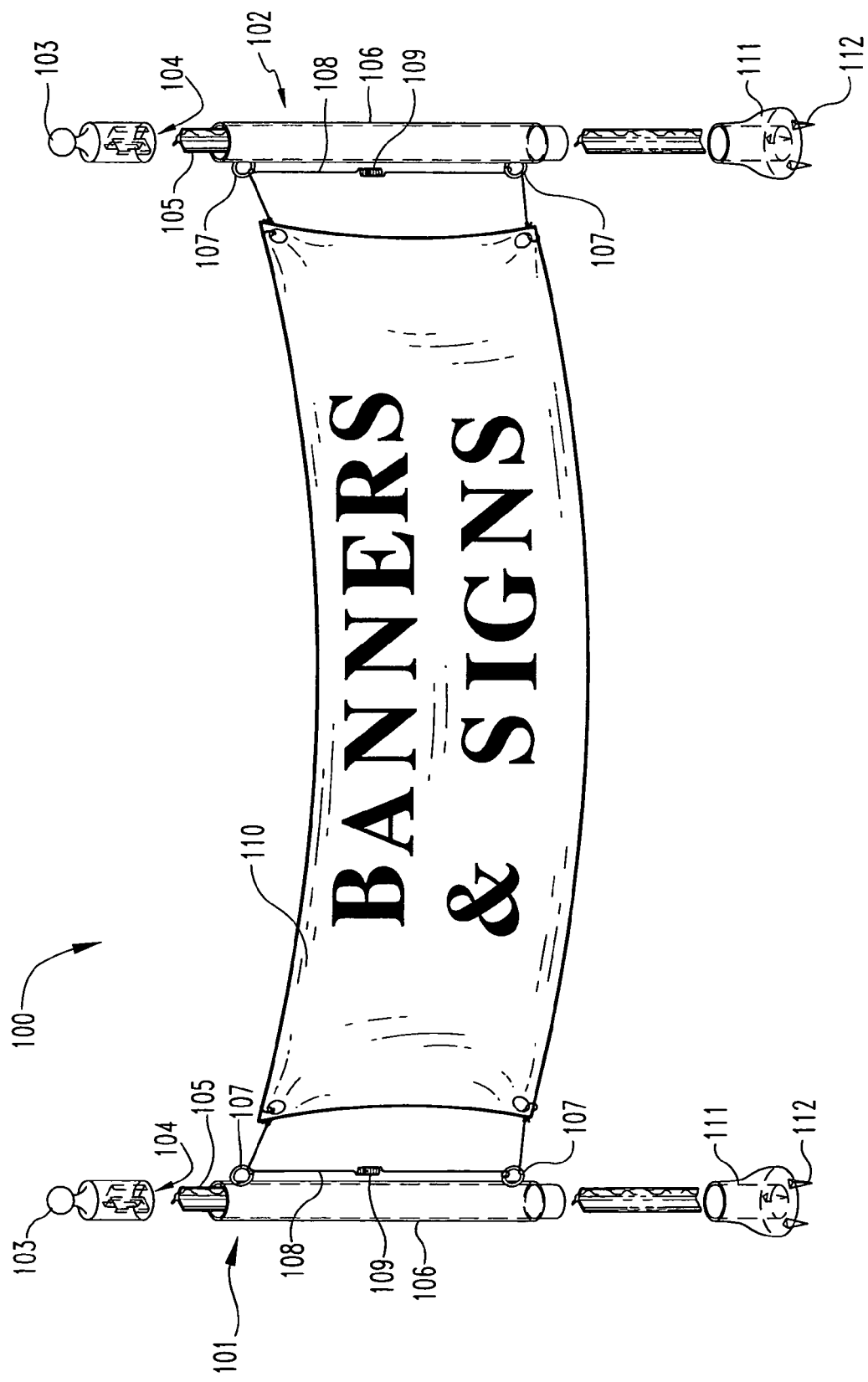
FIG. 8 provides a perspective view of a T-post supported banner system of the invention.

With reference to FIG. 8, shown is a banner system 100 in accordance with one embodiment of the invention. Banner system 100 includes a first post 101 and a second post 102. Posts 101 and 102 each include an upper cap element 103 which can have functional and/or decorative features, defining an internal void 104 for mating with an upper end of a T-post 105. Posts 101 and 102 each include a sleeve element 106 having attached thereto or formed therewith mounting rings 107. System 100 further includes a rope, string, wire or other elongate flexible member 108 received through mounting rings 107 and attached to banner or sign member 110 for bearing a message. Banner or sign member 110 can be constructed of a flexible or rigid material and can bear a message or other image for display. In the illustrated system 100, also included are tension springs 109 connected to flexible members 108 and configured to maintain tension on the banner 110 via flexible members 108. It will be understood in this regard that other similar means for maintaining tension on banner 110 can be used, for example by including elongate flexible members 108 that possess elasticity or other memory properties suitable to maintain tension on banner 110 such as, for example, devices commonly as known as "bungee cords". In addition or alternatively, springs 109 may be replaced by cinching devices or clips operable to secure flexible members 108 after they are manually drawn to the desired level of tension. In the illustrated system 100, posts 101 and 102 also each include a footing element 111 mateable with sleeve element 106 and including ground-engaging members 112 such as spikes.

Figure 9:
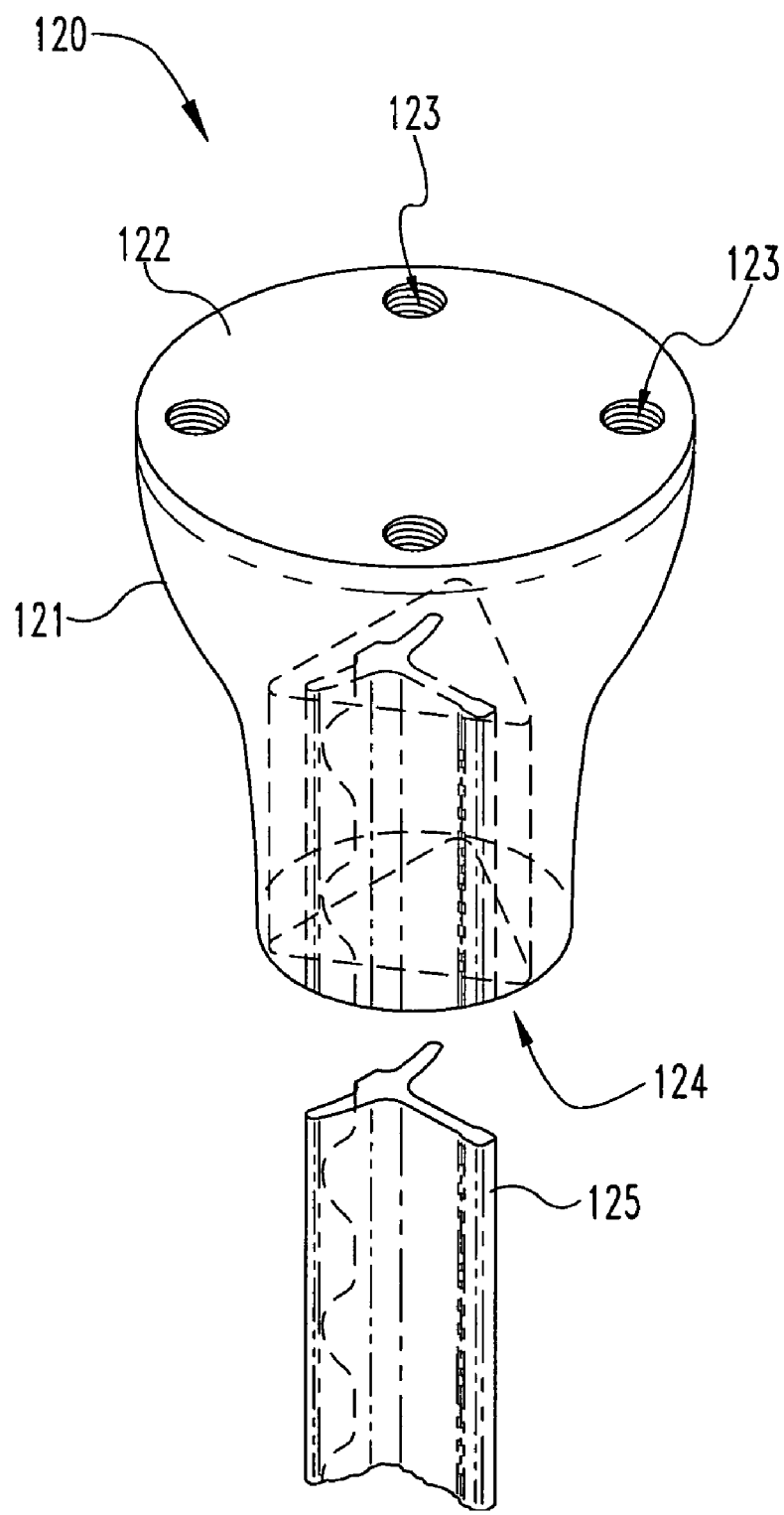
FIG. 9 provides a perspective view of a T-post mounted support plate of the invention having an alternative T-post mating configuration.

With reference now to FIG. 9, shown is another mounting plate embodiment 120 of the present invention. Mounting plate 120 is similar to that shown in FIG. 1, including downwardly depending side walls 121, an upper bearing surface 122 and apertures 123. Mounting plate 120, however, defines an internal void 124 non-conforming to the contours of T-post 125. Instead, void 124 in the illustrated embodiment has a generally triangular shape but is sized so as to frictionally contact the outer most projecting surfaces of T-post 125 to stably retain mounting plate 120 on T-post 125 and also avoid rotation thereof. It will be understood in this regard that other non-conforming shapes that nonetheless frictionally engage T-post 125 in a fashion which resists rotation can be used in additional embodiments of the invention, including for example both polygonal and non-polygonal shapes.

With reference now to FIGS. 10 and 11, shown are T-post mounted rope holders in accordance with the invention. The holder 130 of FIG. 10 includes a mounting portion 131 defining an internal void 132 configured to mate with a T-post Holder 130 also includes an upstanding, closed loop structure 133 through which a rope 134 or other elongate article can be received. In FIG. 11, alternate holder 135 includes a body 136 defining an internal void 137 for mating with a T-post. Body 136 also includes a first arm 138 and a second arm 139 defining openings 140 and 141, respectively, for receiving a rope or other elongate article.

Figure 12:
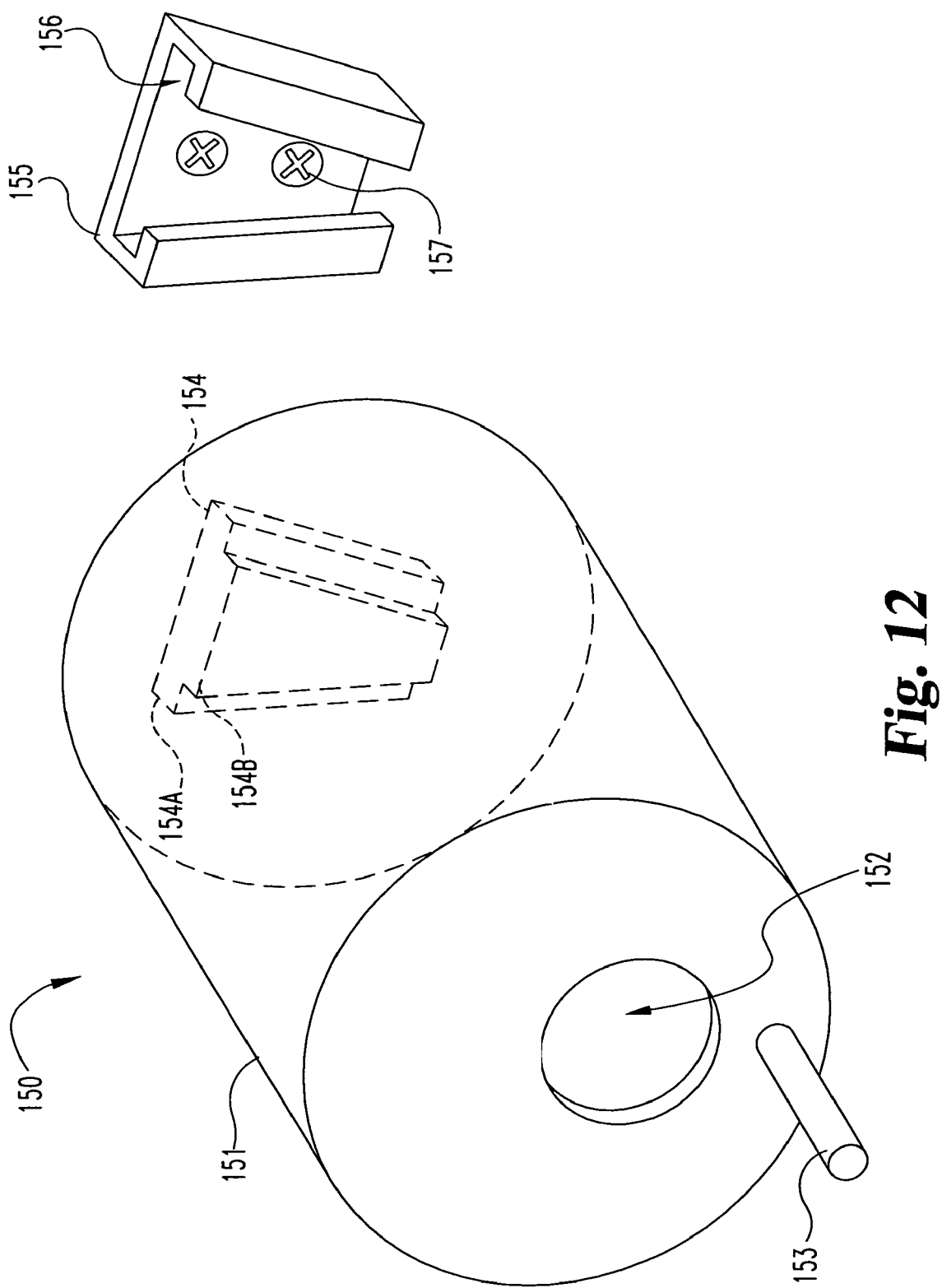
FIG. 12 provides a perspective view of a wall-mounted birdhouse system of the invention.

With reference to FIG. 12, shown is a wall-mountable birdhouse system 150. System 150 includes a housing structure 151 defining an internal enclosure and opening 152 into the defined enclosure. Structure 151 also includes a perch 153 mounted adjacent opening 152. Housing structure 151 also includes a mounting element 154 attached to its rear surface. Mounting element 154 is generally trapezoidal in shape and includes a first portion 154A spaced from the rearward wall of structure 151 be a second portion 154B. Mounting structure 154 can thereby cooperate with a wall-mounted receiver 155 defining a trapazoidally-shaped opening 156 sized and shaped to receive portion 154A of mounting structure 154 whereby housing structure 151 can be stably supported by receiver 155 under the force of gravity. Receiver 155 can be mounted to an adjacent wall structure by connectors 157, such as screws or bolts, received through respective apertures in receiver 155.

FIG. 13 illustrates another multi-purpose mounting system of the present invention. System 160 in one embodiment includes a first component having an upstanding post 161 and defining an internal void 162 sized and shaped for receipt upon the top of a T-post. A cooperating mounting element 164 defines at least one opening and preferably two openings 165 corresponding in shape and size to receive over post 161. Mounting element 164 includes an upstanding wall 166 defining at least one aperture 167 and preferably multiple such apertures for attachment of an accessory, such as a birdhouse, against the outward face 168 of the mounting structure 164 with appropriate connectors. Mounting structure 164 also includes arms 169 and 170 extending transversely relative to wall 166, and preferably perpendicularly thereto, which define openings 165.

FIG. 13 also usefully illustrates a wall-mounting system that includes mounting structure 164 and a cooperating secondary mounting structure 171 having portions receivable within openings 165 of mounting structure 164. Secondary mounting structure 171 thus includes an upstanding arm 172 and lateral arms 173 and 174 extending transversely and desirably perpendicularly to upstanding arm 172. Lateral arms 173 and 174 define respective downwardly-extending portions 175 and 176 which are sized for receipt within openings 165 of mounting structure 164. In use, mounting structure 164 can be mounted to an adjacent wall of a house or other structure using connectors extending through apertures 167. Secondary mounting structure 171, attached to an accessory such as a birdhouse received against the outward face 177 and using appropriate connectors extending through apertures 178, can be positioned with portions 175 and 176 over top openings 165, and lowered into place to mount the accessory to the adjacent wall.

Figure 14:
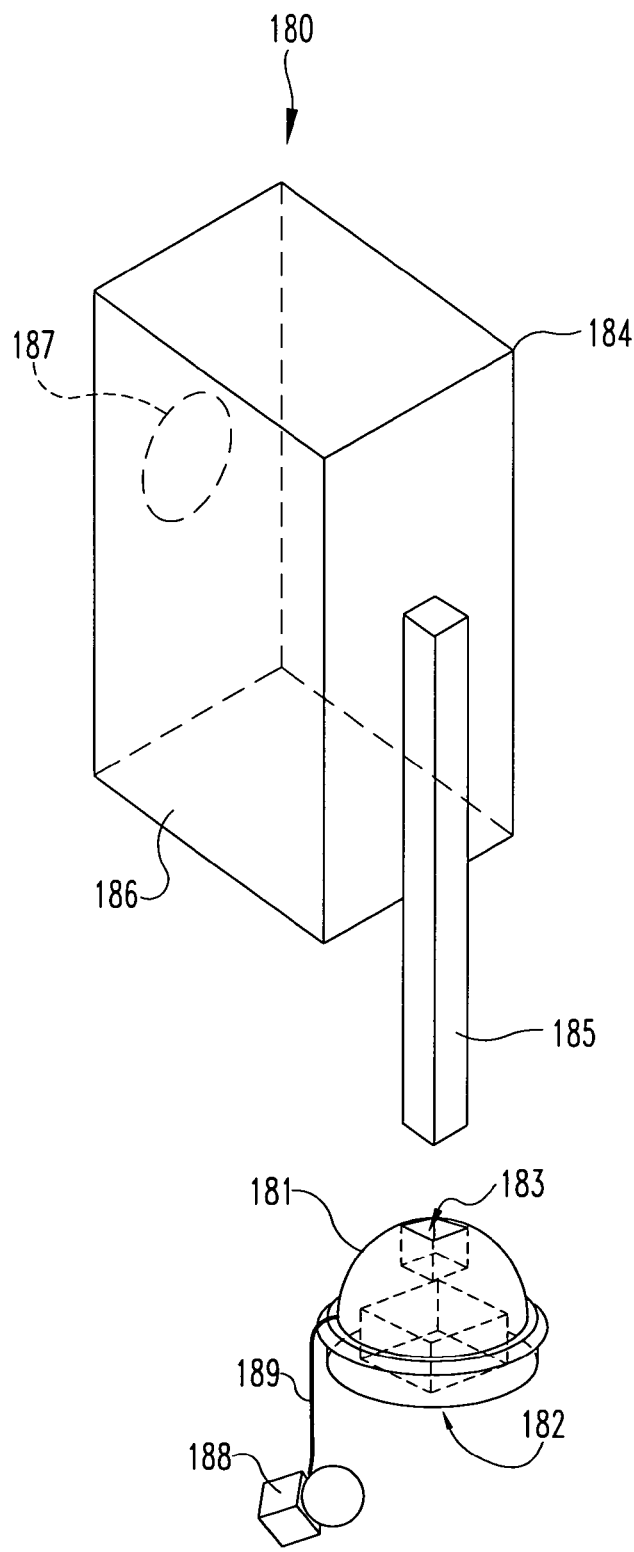
FIG. 14 provides a perspective view of a post-mounted birdhouse system of the invention.

With reference to FIG. 14, shown is another birdhouse mounting system 180 in accordance with the invention. System 180 includes a cap and mounting element 181 defining an inner void 182 for receipt atop a post, such as a T-post or a post of a wooden or chain-link fence. Element 181 defines a second void 183 opening to an upper surface thereof and providing means for mounting an accessory. In the illustrated embodiment, a birdhouse includes a housing structure 184 and a mounting post 185. Mounting post 185 has a lower portion receivable within void 183 of capping and mounting element 181. Housing structure 184 defines an internal enclosure 186 for housing birds and provides an opening 187 for access to the enclosure 186. Cap and mounting element 181 also includes an alternate square void plug 188 attached by a tether 189.

Figure 15:
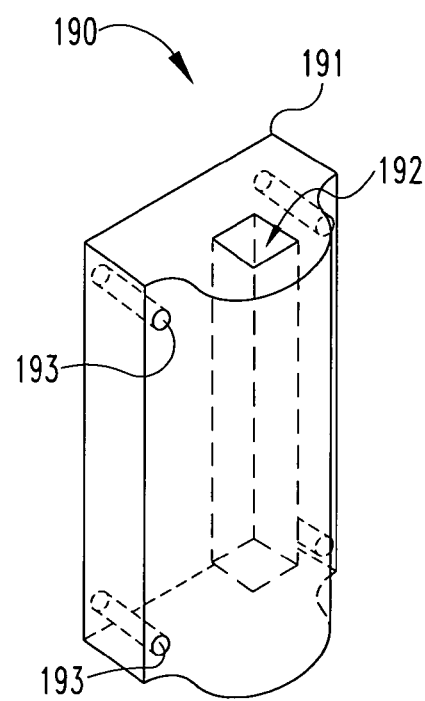
FIG. 15 provides a perspective view of a wall-mounted plate co-operable with the birdhouse component of FIG. 14.

With reference to FIG. 15, in combination with the birdhouse structure illustrated in FIG. 14, usefully illustrated is a wall-mounting system 190 for mounting a birdhouse. System 190 includes a wall-mounted element 191 defining an internal opening or void 192 for receiving mounting post 185 of the illustrated birdhouse structure. Wall mounted element 191 further defines apertures 193 which can be used to mount the element 191 to an adjacent wall structure with appropriate connectors. Once so mounted, the illustrated birdhouse structure can be removably received within wall mounted element 191 by lowering post 185 into opening 192.

Figures 16, 17:
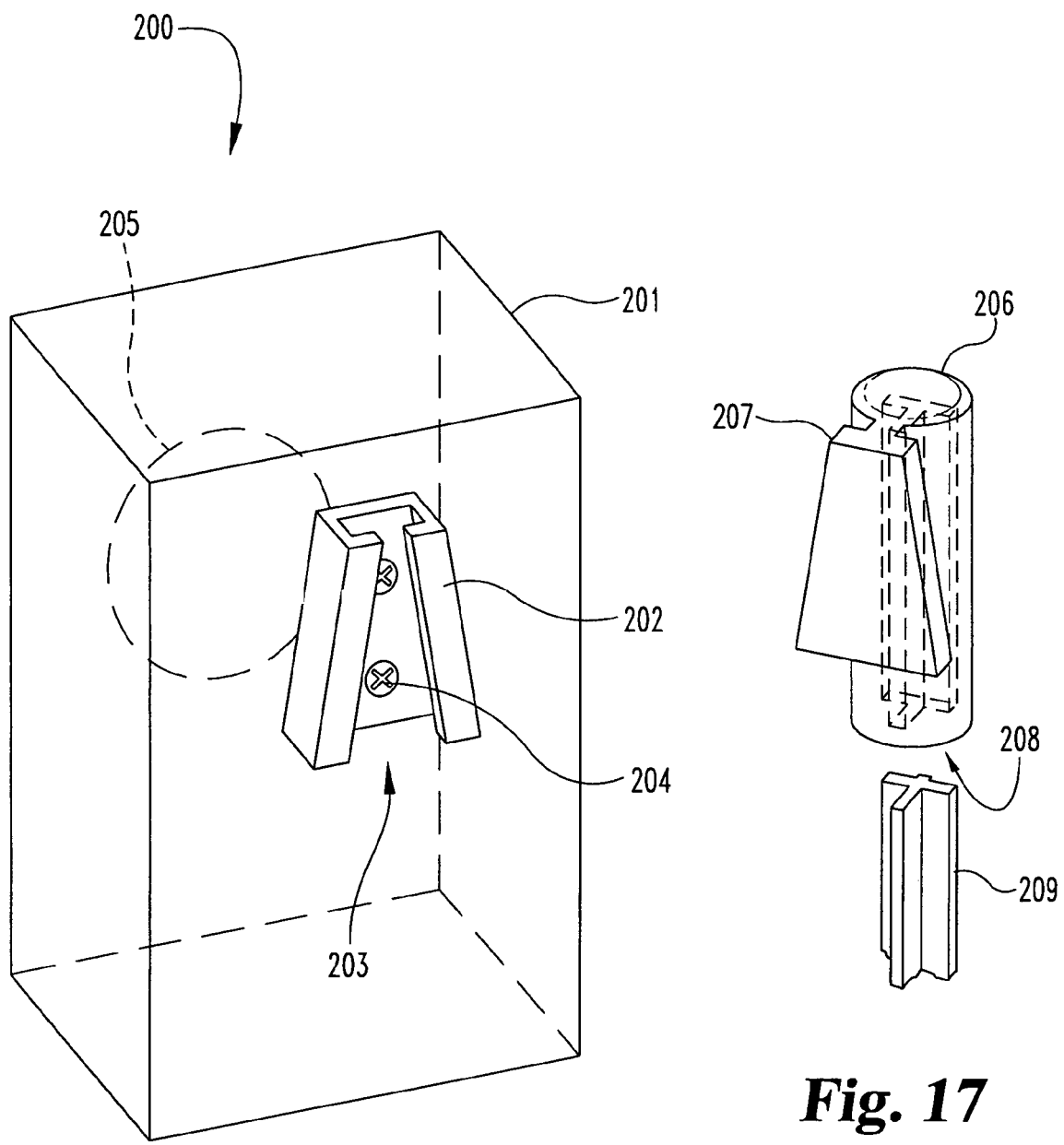
FIGS. 16 and 17 provide perspective views illustrating components of a post-mounted birdhouse system of the invention.

With reference now to FIGS. 16 and 17 together, illustrated is another T-post mounted birdhouse system 200 of the invention. System 200 includes a housing structure 201 defining an internal enclosure and a mounting bracket 202 attached to the rearward surface of structure 201 with connectors 204 received through corresponding apertures in bracket 202. Housing structure 201 further defines an opening 205 providing access to the internal enclosure. FIG. 17 illustrates a T-post mounted receiver 206 defining a trapezoidal wedge piece 207. Wedge piece 207 is receivable within wedge-shaped slot 203 defined by bracket 202. Receiver element 206 further defines an internal void 208 sized and shaped for mating receipt over top T-post 209. In use, housing structure 201 can be lowered onto receiver element 206 with wedge piece 207 extending into slot 203 to provide a removable mount of housing structure 201 to receiver 206.

Figure 18:
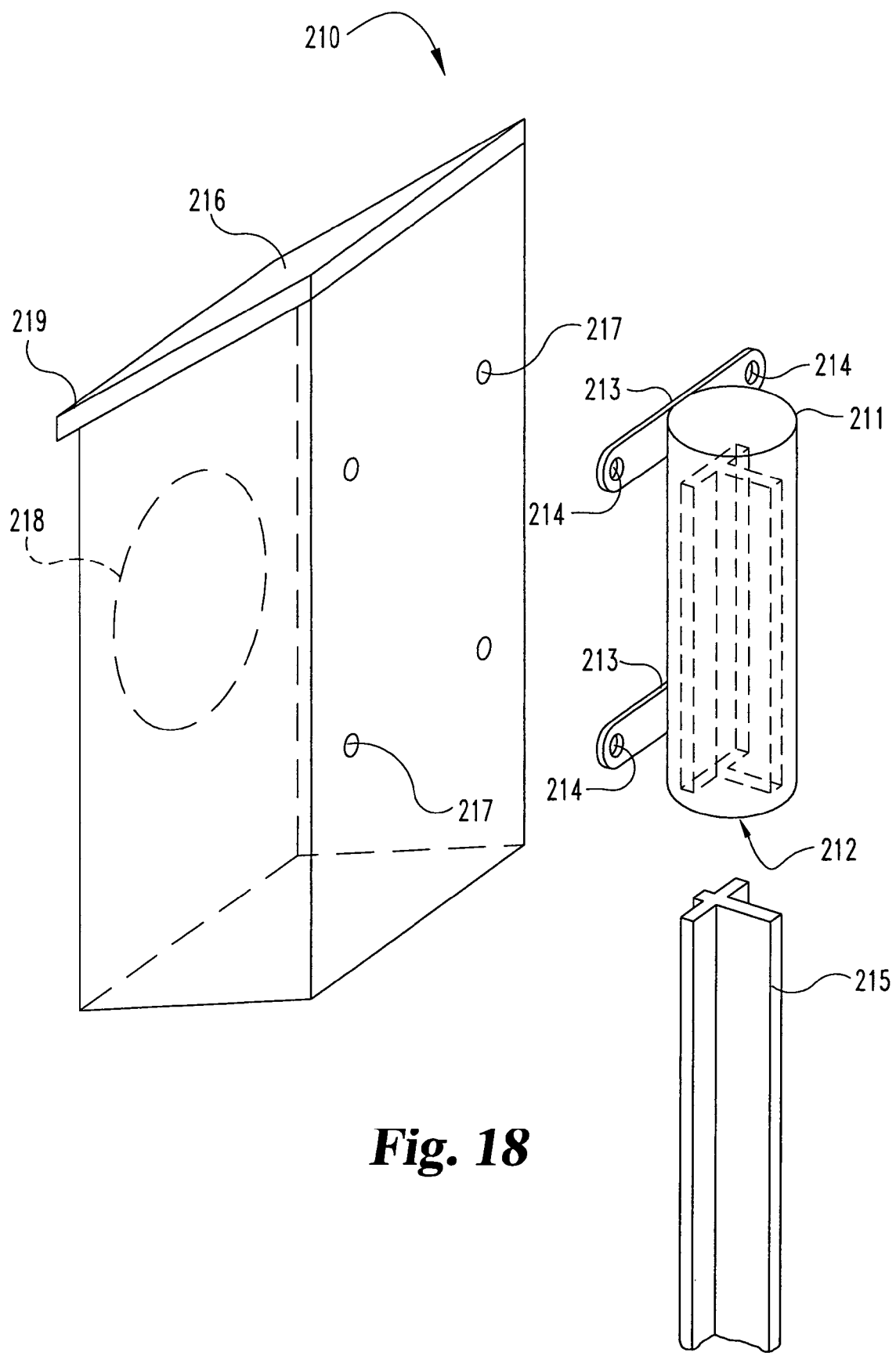
FIG. 18 provides a perspective view of a post-mounted birdhouse system of the invention.

Referring now to FIG. 18, shown is another T-post mounted birdhouse system 210 of the present invention. System 210 includes a multi-purpose mounting cap 211 defining an internal void 212 sized and shaped for mating with a corresponding T-post 215. Mounting cap 211 further includes lateral arms 213 each defining a plurality of apertures 214. System 210 further includes a housing structure 216 defining an internal enclosure and mounting apertures 217 positioned in registry with apertures 214 of mounting cap 211. Suitable connectors extending through apertures 214 and 217 can be used to attach housing structure 216 to mounting cap 211. Housing structure 216 further defines an opening 218 providing access to its interior enclosure. In the illustrated embodiment, housing structure 216 includes a sloped roof 219 which helps to resist puddling or pooling of water atop housing structure 216.

Figure 19:
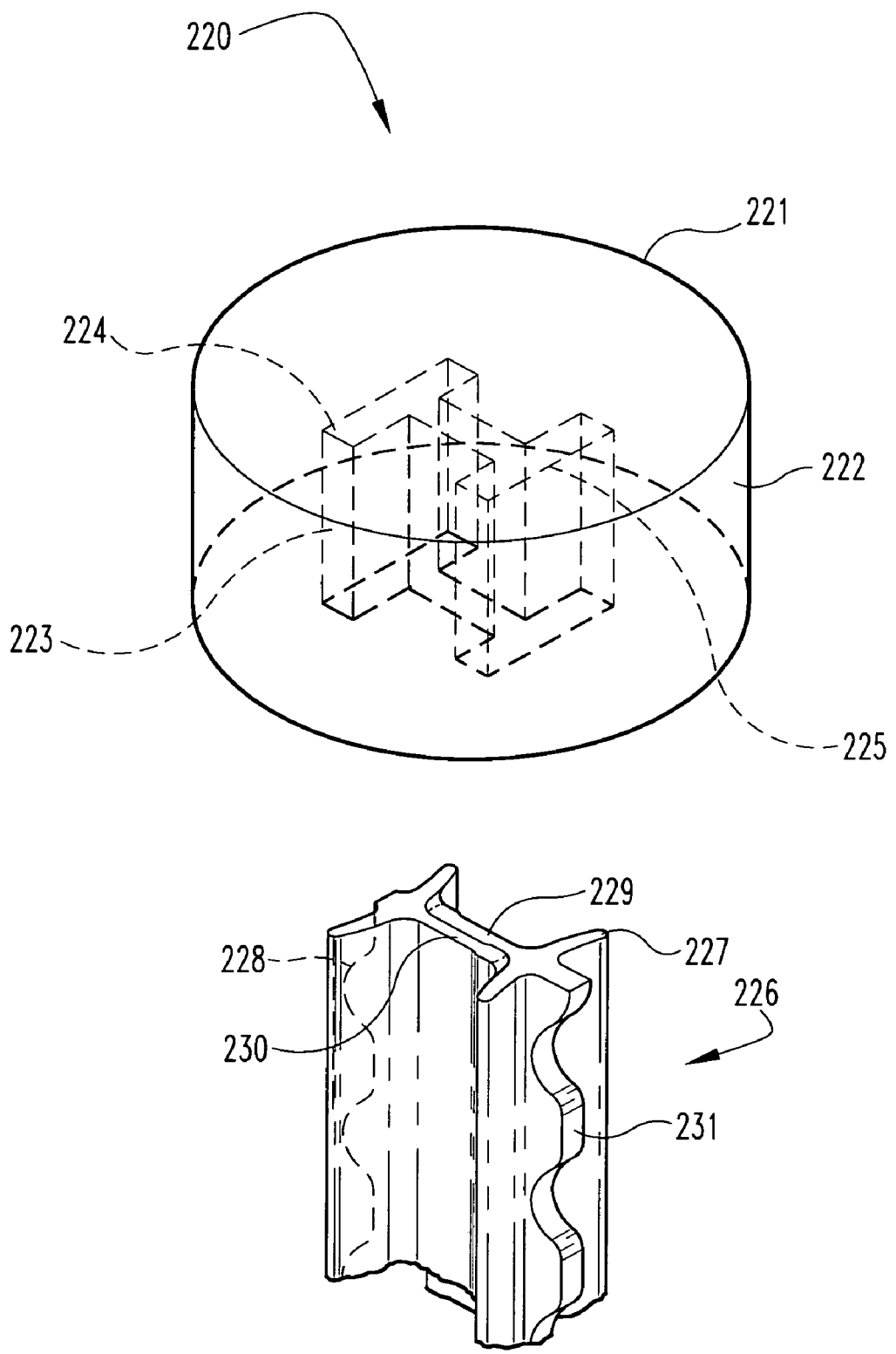
FIG. 19 provides a perspective view depicting a T-post support system including two associated T-posts and a corresponding retaining element receivable over the combined T-posts for driving the combination into the ground.
Figure 20:
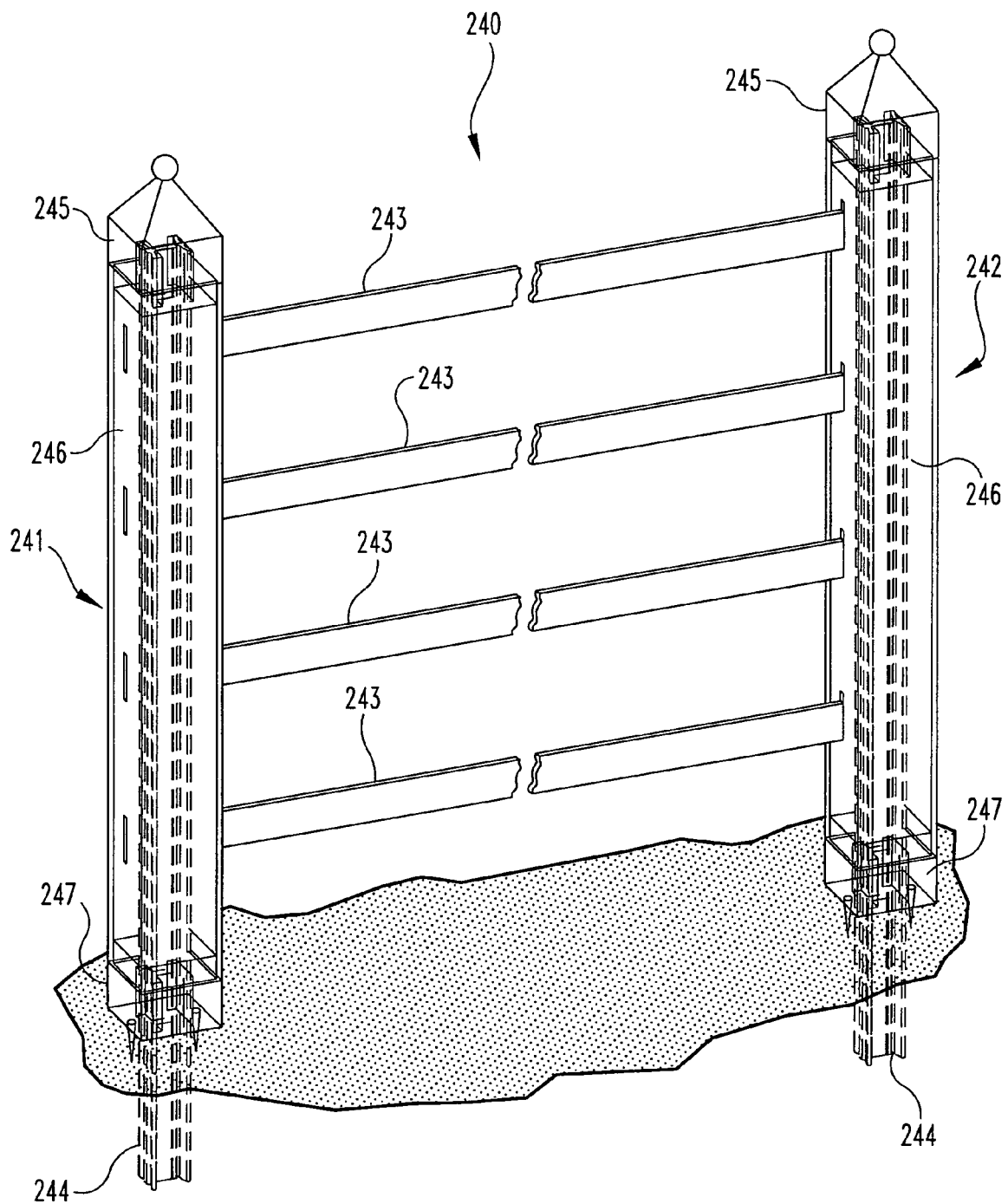
FIG. 20 provides a perspective view of a T-post fencing system of the invention.

FIG. 19 illustrates a system 220 for driving a dual T-post assembly into the ground, for use in situations in which a more robust post structure is desired, for example in the case of a street sign, fencing system, or other similar implement. System 220 includes a driving cap 221 having a generally cylindrical outer surface 222. Driving cap 221 defines an internal void 223 having first and second portions 224 and 225 sized and shaped to correspond to components of an overlapped dual-T-post assembly 226. Assembly 226 includes a first T-post 227 and a second T-post 228 having an overlapped region formed by overlapping the long arms 229 and 230 of respective T-posts 227 and 228. In such an overlapped condition, splines or ribs (e.g. 231) of the T-post will face outwardly from one another. In use, T-posts 227 and 228 are positioned to the overlapped condition, and potentially held in such position by appropriate welds, clamps or other means. Driving cap 221 is then placed over top the assembly 226 and a driving force is applied to the upper surface of driving cap 221 to drive assembly 226 into the ground. The driving force can, for example, be applied using a conventional cylindrical T-post driver. Once driven, the assembly 226 provides a post having increased capacity to withstand vertical and lateral loads imposed upon accessories or other structures mounted to T-post assembly 226. For example, with reference to FIGS. 2, 3 and 8, supported mailbox and banner or sign structures may benefit from support by T-post assembly 226, and components thereof can be suitably modified to accommodate the assembly 226 rather than a single T-post.

Figure 21:
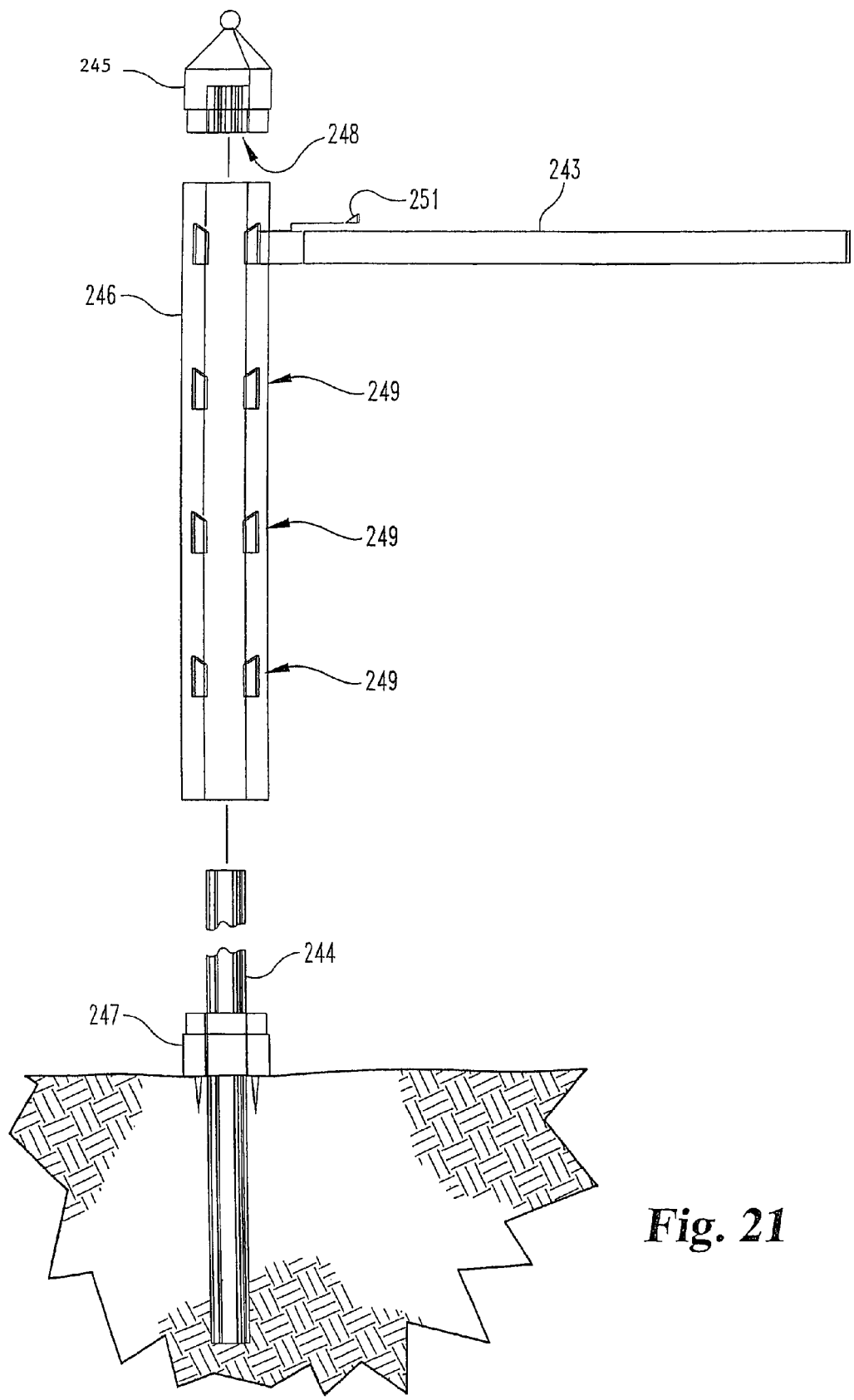
FIG. 21 provides an exploded view of elements of the fencing system of FIG. 20.
Figure 22:
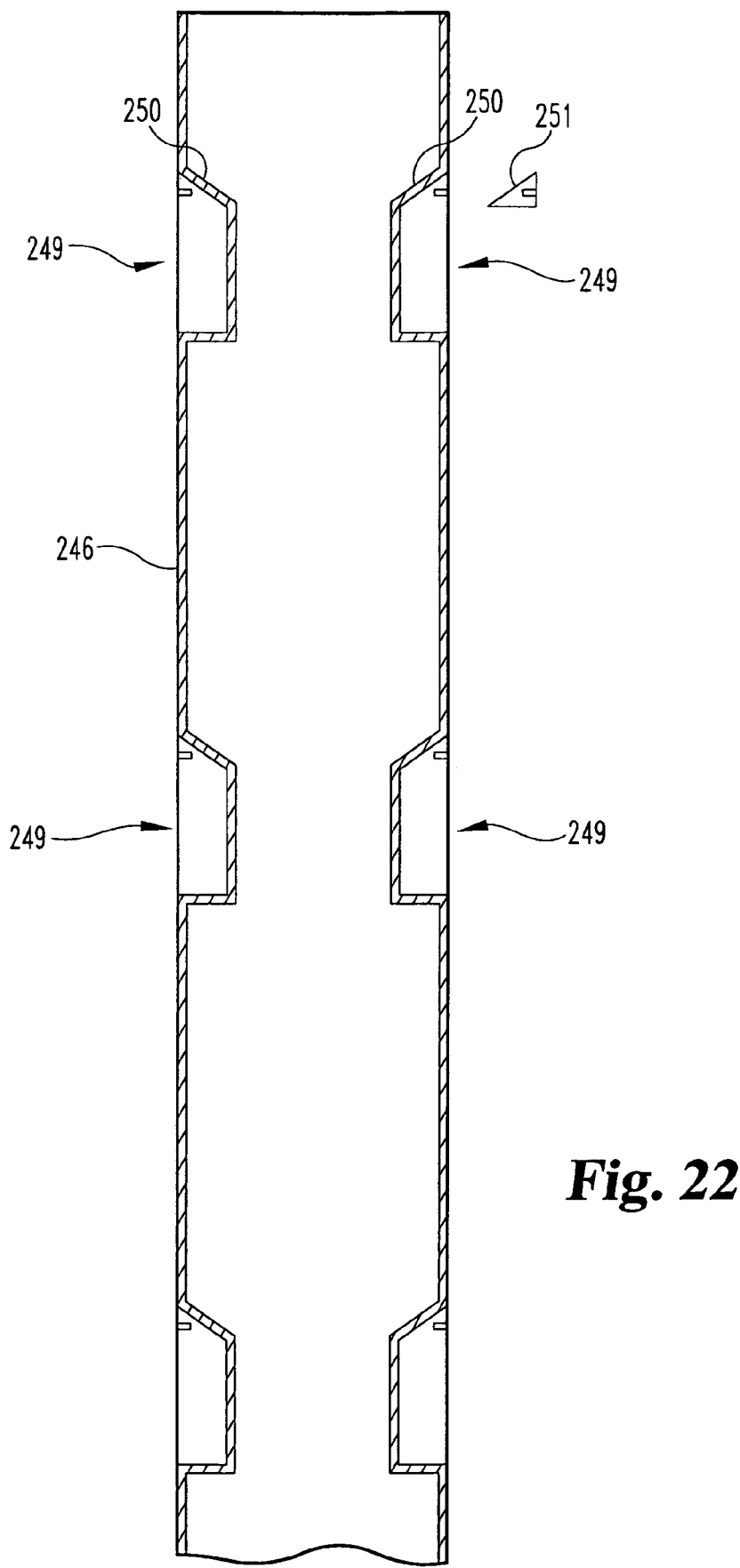
FIG. 22 provides a cross-sectional view of a post sleeve element of the fencing system of FIG. 20.
Figure 23:
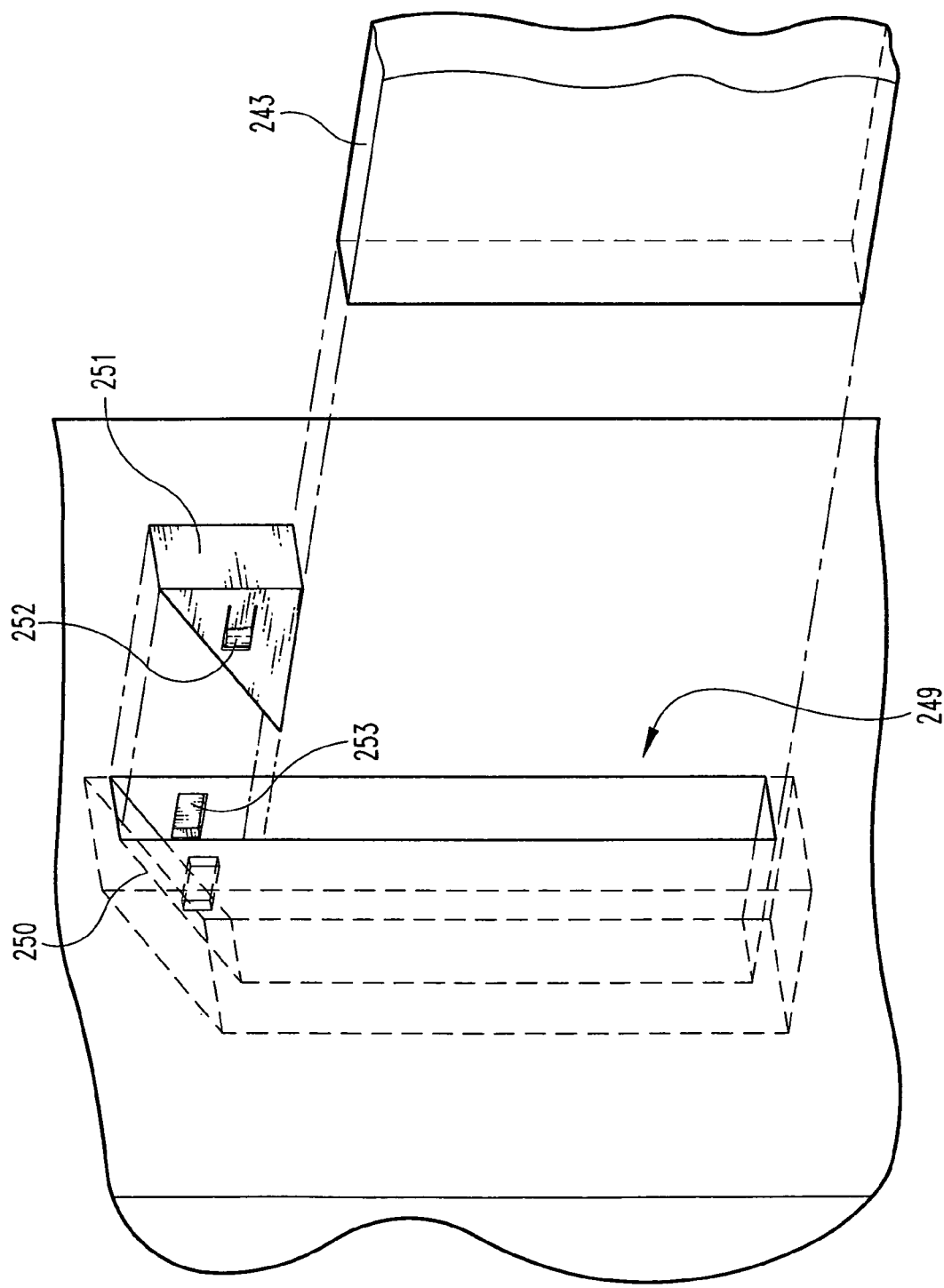
FIG. 23 provides a fragmentary view depicting cross-board, sleeve and filler elements of the fencing system of FIG. 20.

With reference now to FIGS. 20 through 23, shown is one embodiment of a fencing system of the invention and components thereof. Fencing system 240 includes a plurality of posts such as first post 241 and second post 242. Posts 241 and 242 each include a dual T-post assembly as illustrated in FIG. 19 along with a mating cap 245, sleeve 246, and footing element 247 combination. These components can have features similar to those described hereinabove for corresponding components. In alternative embodiments, posts 241 and 242 could each be supported by a single T-post, as illustrated for other embodiments disclosed herein, and/or the T-post(s) can be replaced by other post structures received into the ground, including posts with circular or ovate cross-sections, X-shaped cross sections, or other suitable shapes. A plurality of cross boards 243 are received and supported between post 241 and 242. As best shown in FIG. 21, cap 245 defines an internal void 248 that corresponds and mates with the shape of the dual T-post assembly 244. With continuing reference to FIG. 21 along with FIGS. 22 and 23, sleeve 246 defines slots or openings 249 for receiving the ends of cross boards 243. Each opening 249 includes an inclined upper surface 250. Inclined upper surface 250 provides clearance for use during the operation of mounting cross boards 243 between posts 241 and 242. In particular, to mount a cross board 243, the board is inclined relative to its intended final position and the lower end thereof is inserted into a slot 249 of one of sleeves 246. The cross board 243 is then rotated toward its intended lateral position, desirably generally perpendicular to posts 241 and 242. In this motion, the upwardly inclined surface 250 of the slot 249 of the opposite sleeve 246 provides clearance through which the downwardly-moving end of cross board 243 swings until cross board 243 is in its final resting position with its lower surface contacting the lower surface of the slot 249. It will be appreciated that this arrangement leaves an open space or void within slots 249 occurring above the upper edge of the mounted cross board 243. In accordance with one embodiment of the invention, a wedge-shaped filler piece 251 is inserted to fill that void. Wedge-shaped piece 251 can include a detent tab 252 which becomes received within a corresponding hole or opening 253 in the side wall of slot 249. In this fashion, a reversible snap fit of piece 251 into the upper void of slot 249 can be attained. Piece 251 can also engage the adjacent cross-board to stabilize the same against vertical and/or lateral movement. Such engagement can be any suitable mechanical engagement including for instance frictional or detent-style engagements.

With reference now to FIG. 24, shown is a composite cross board assembly 260 which in one embodiment can be used in the place of cross board 243 of FIGS. 20-23. Assembly 260 includes an internally-received T-post 261 or another suitable reinforcing element, the ends of which are received within generally rectangular caps 262 and 263 forming the ends of the cross board assembly. Assembly 260 further includes a generally rectangular sleeve 264 fitted to caps 262 and 263, for example by frictional or bonded receipt over shoulders 265 of caps 262 and 263. While reinforced assembly 260 is shown and discussed as suitable for cross boards 243 in FIGS. 20-23, it will be understood that such reinforced assemblies 260 are not necessary to broader aspects of the inventions, and cross boards can be fabricated from any suitable material and can lack internal reinforcements.

Referring now to FIG. 25, shown is a telescoping cross board assembly 270 that can be used in fencing systems as illustrated in FIGS. 20-23. It is often the case that the final posts in a fence row will be separated from a prior post by a non-standard distance. In this situation, it is desirable to provide for an assembly which provides flexibility in the length of cross boards to be received in the final segment of the fence row. Referring to assembly 270, it can be assembled to a variety of lengths as appropriate by choosing or cutting internal reinforcing T-post 271 to the required length and fitting a first cap 272 on one end thereof. A first sleeve portion 274 is then fitted over shoulders of cap 272. A second sleeve portion 275, which is capable of telescoping within sleeve portion 274, is then fitted to a second cap 273, and the thus-created assembly is then telescoped within sleeve portion 274 and cap 273 is friction fitted and/or attached or bonded over the opposite end of the reinforcing T-post 271. The resulting assembly 270, manufactured to length, can then be used in the final and potentially non-standard segment of the fence row, generally in the same manner as discussed in connection with FIGS. 20-23 above.

Figure 26:
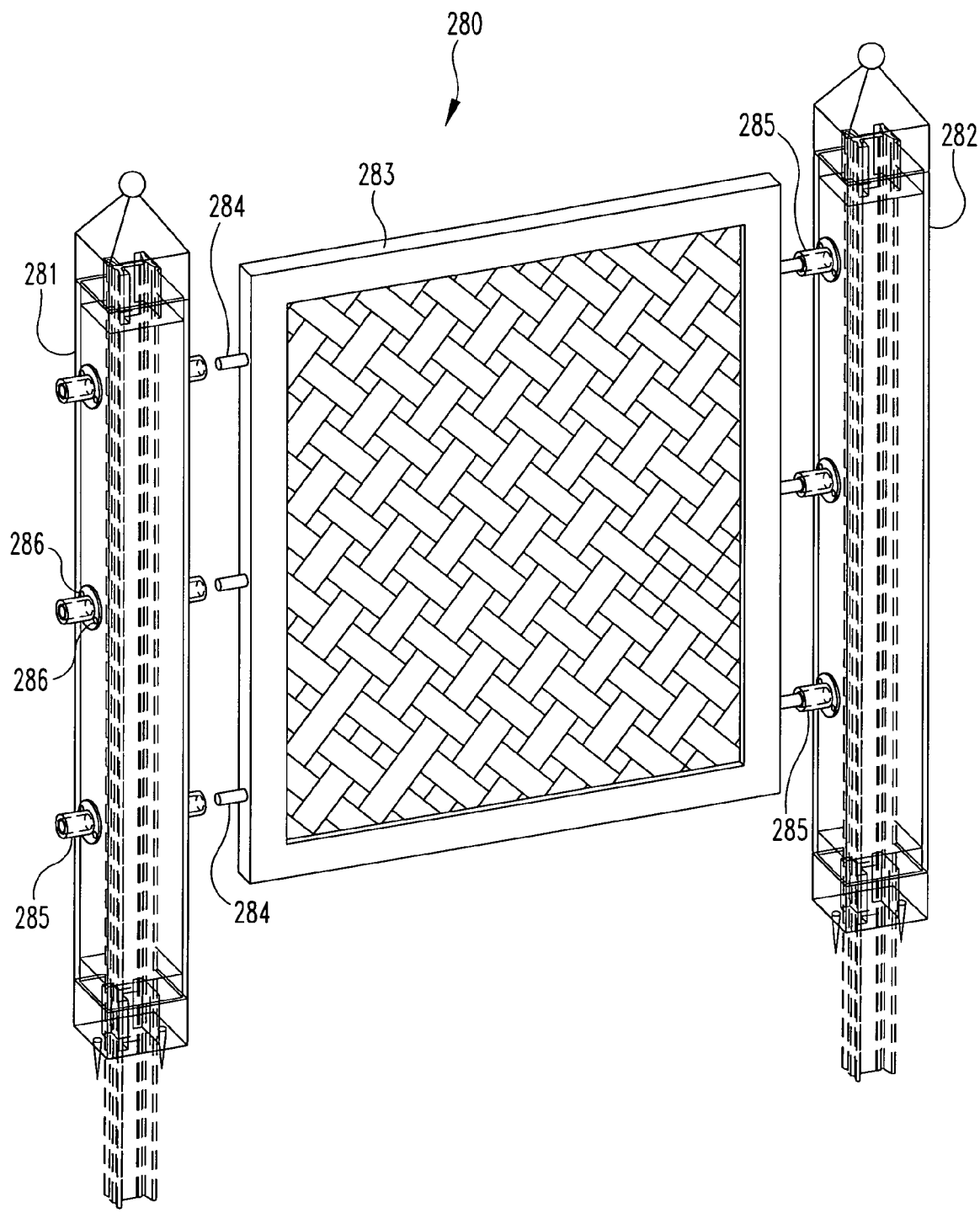
FIG. 26 illustrates one embodiment of a fencing system of the invention.

With reference to FIG. 26, shown is another fencing system 280 of the invention. System 280 includes a first post assembly 281 and a second post assembly 282, which are similar to the assemblies 241 and 242 of FIG. 20 except lacking the slots 249 in the sleeve elements. System 280 includes a fence panel 280, which can as illustrated be a latticework or other privacy panel, mounted to the post assemblies 281 and 282. In the illustrated embodiment, such mounting is achieved with lateral pegs 284 that are connected to panel 283 and that cooperate with collared mount elements 285 defining bores into which pegs 284 are received. Collared mount elements 285 are in turn attached to posts 281 and 282 with fasteners 286 such as screws, bolts, nails, or any other suitable fastener. A plurality of the fencing system units 280 can be assembled to create an elongate privacy and/or security fence in residential or commercial areas.

Figure 27:
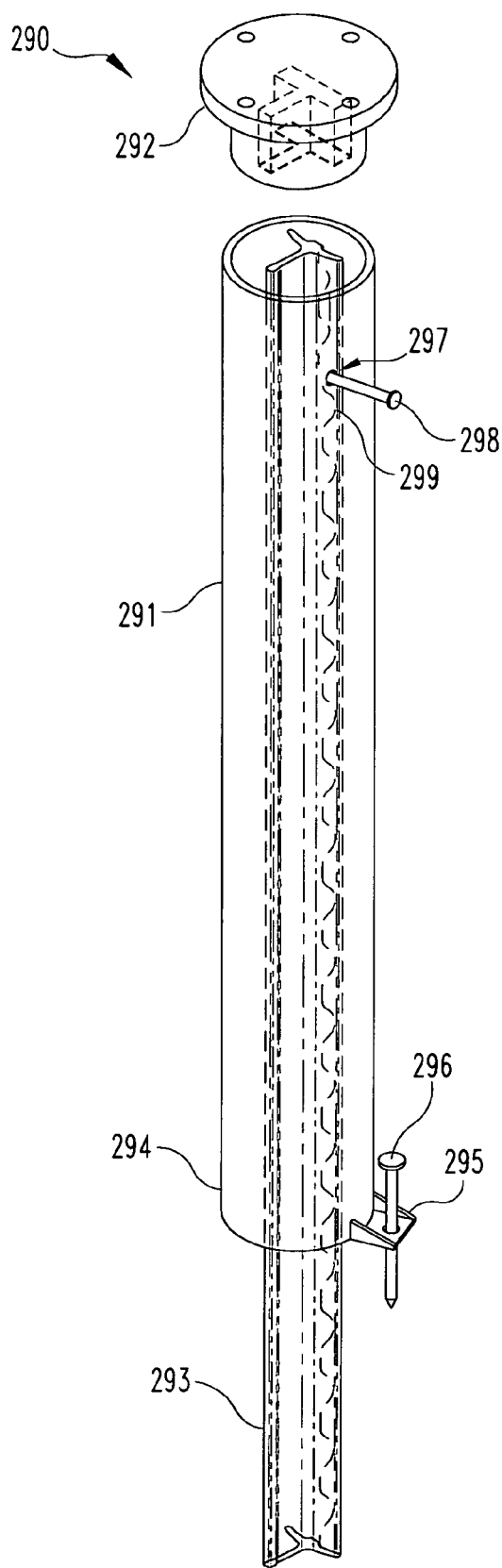
FIG. 27 illustrates an alternative T-post mounting assembly of the invention.

FIG. 27 shows an alternative mounting post system 290 of the invention. Assembly 290 includes a post assembly 291 and a mounting cap 292. Post assembly 291 includes a T-post 293 received into the ground and a sleeve 294 received over the T-post. Sleeve 294 includes a laterally-extending foot 295 which contacts or resides near the surface of the ground and has an opening defined therein for receiving a stake 296 for securing the position of the sleeve 294 (e.g. against vertical, lateral and/or rotational motion). Sleeve 294 further includes an opening 297 defined in a sidewall thereof. Opening 297 receives a pin 298. Pin 298 extends into the inner lumen of sleeve 294 and passes between adjacent ribs or flanges 299 of the T-post 293. In this fashion, additional resistance of the sleeve 294 to motion can be provided.

Figure 28:
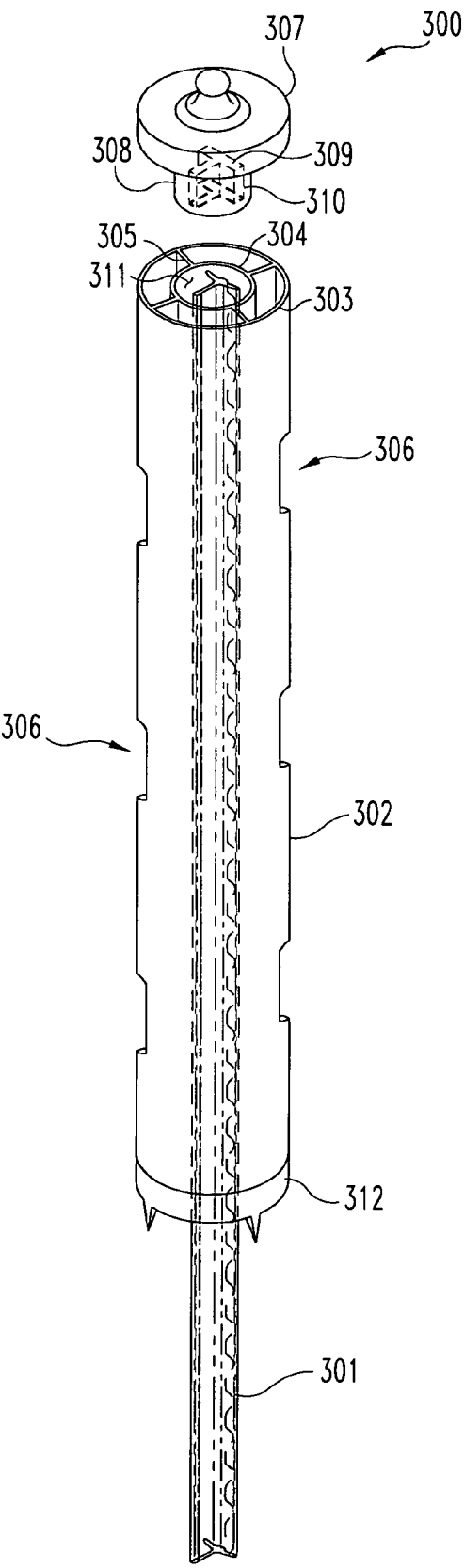
FIG. 28 illustrates an alternative T-post-supported fence post assembly of the invention.
Figure 29:
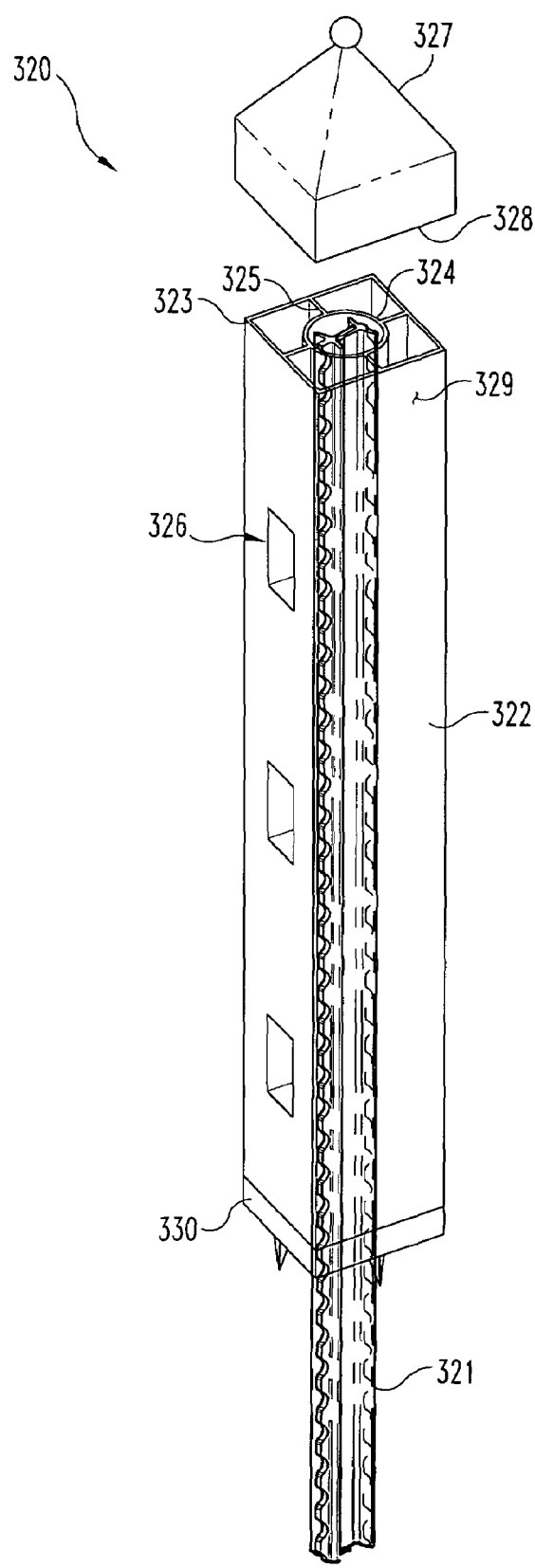
FIG. 29 illustrates an alternative T-post-supported fence post assembly of the invention.

Referring now to FIGS. 28 and 29, additional post systems of the invention are illustrated. In FIG. 28, a post system 300 includes an internal T-post 301 and an outer sleeve element 302 mounted thereover. Sleeve element 302 includes an outer tube portion 303 and an inner tube portion 304 connected by a plurality of struts 305. Sleeve element 302, having this design, can optionally be manufactured by extrusion. In certain embodiments, sleeve element includes slots 306 in sidewalls thereof such that post system 300 can be used in fencing systems as illustrated herein. Post system 300 also includes a cap member 307 having a downwardly depending sleeve 308 with a reduced diameter relative to upper portions of cap member 307. Sleeve 308 defines an internal void 309 configured to mate with the upper end of T-post 301. In the illustrated embodiment, inner tube portion 304 has an internal diameter of a size sufficient to leave clearances between its inner surface 311 and the arms of T-post 301. In this manner, downwardly depending sleeve 308 of cap member 307 fits within inner tube 304. Sleeve 308 can be sized and shaped such that its outer surface 310 engages the inner surface 311 of inner tube portion 304. This engagement can for example be frictional, threaded, or otherwise, and can serve to provide resistance to lateral motion of the sleeve element 302 relative to the T-post 301. As shown, post system 300 can include a footer element 312 similar to those described hereinabove.

FIG. 29 illustrates a post system 320 of the invention. Post system 320 includes a ground-mounted dual T-post combination 321 as discussed hereinabove and a polygonal (e.g. square or rectangular cross-sectioned) sleeve element 322 received thereon. Sleeve element 322 includes an outer tube portion 323 and an inner tube portion 324 connected by struts 325. Inner tube portion 324 is sized for a close and desirably friction fit over dual T-post assembly 321, to prevent substantial lateral movement of the sleeve element 322 relative to the dual T-post assembly 321. In certain embodiments, sleeve element 322 includes slots 326 in sidewall portions thereof such that it can be used in fencing systems as disclosed herein. Post system 320 also includes a cap member 327 having a lower collar 328 sized and shaped to fit over the outside of sleeve element 322, e.g. with the inner surfaces of collar 328 friction fitted (and potentially otherwise attached such as with a bonding agent or connector(s)) over the outer surfaces 329 of sleeve element 322. As shown, post system 320 can include a footer element 330 similar to those described hereinabove.

In certain embodiments, the invention provides post mounting systems that include a post structure including a post having a cross-sectional shape including three or more outwardly-extending arms (e.g. a T-post), with the outwardly-extending arms each having an outermost arm surface. The post structure also includes a sleeve element received over the post, the sleeve element including an internal cylindrical void, preferably circular in cross section, sized to frictionally engage the outermost arm surfaces of the three or more outwardly-extending arms. The post mounting systems also includes a top-mounted element mounted atop the post structure.

Figure 30:
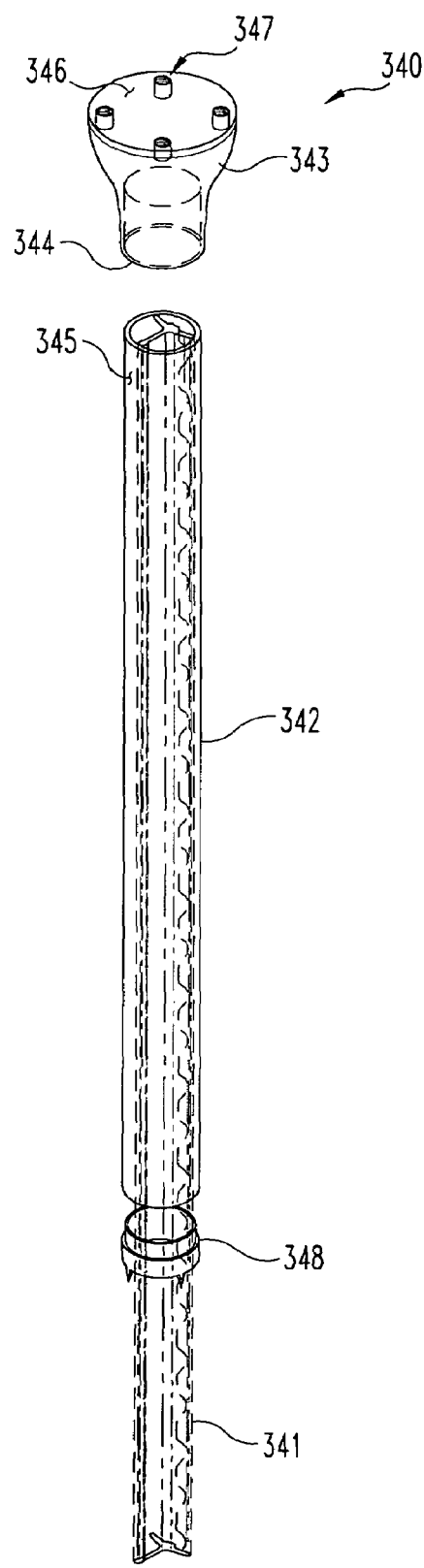
FIG. 30 illustrates an alternative post mount assembly of the invention.

FIG. 30 illustrates one such post mounting system 340. System 340 includes a T-post 341 received within a sleeve element 342. Sleeve element 342 in the illustrated embodiment has a substantially circular cross section and is sized to have an internal diameter that provides a close and desirably friction fit over the radially-extending arms of T-post 341. In this manner, substantial lateral movement of the sleeve element 342 relative to the T-post 341 is prevented. System 340 also includes a capping member 343 having a lower collar portion 344 designed to fit over the outside of sleeve element 342, e.g. with the inner surfaces of collar portion 344 friction fitted (and potentially otherwise attached such as with a bonding agent or connector(s)) over the outer surfaces 345 of sleeve element 322. As illustrated, capping member 343 can have functional features, e.g. being designed as a multi-purpose mounting structure having a bearing surface 346 and apertures 347 generally as discussed for similar mounting caps herein. As shown, post system 340 can include a footer element 348 similar to those described hereinabove.

Figure 31:
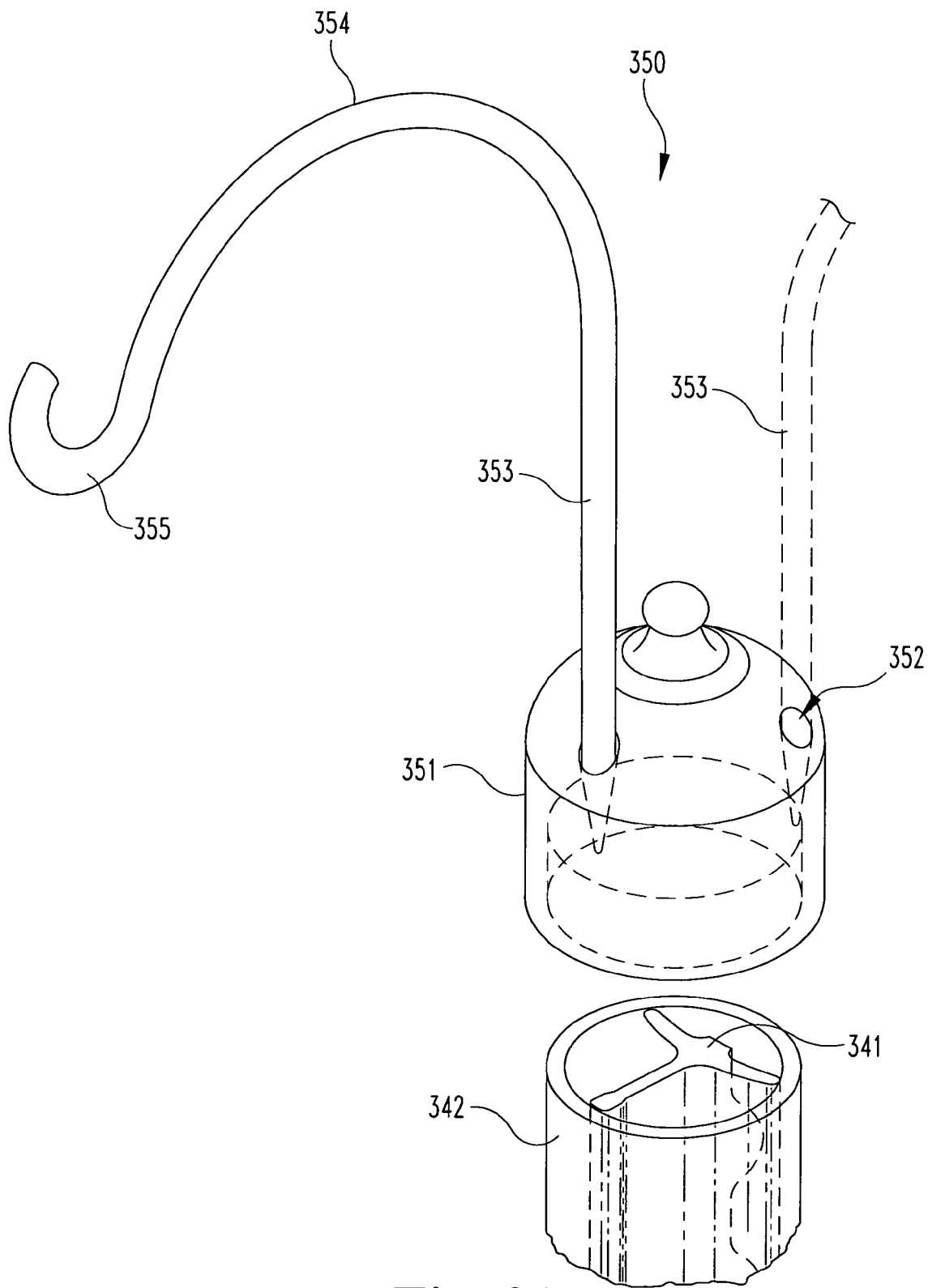
FIG. 31 illustrates a further alternative post mount assembly of the invention.

FIG. 31 shows a break-away view of the top end of a post system 350 of the invention. Portions of the system 350 not shown can be similar to those shown for system 340 of FIG. 30, e.g. including a T-post 341 and sleeve 342 as discussed. In system 350, a capping member 351 is provided having a plurality of holes 352 therein. A rod 353 is received through each hole 352 and extends into the inner lumen of sleeve element 342. Rod 353 can be of sufficient length to extend to the ground for support, or can be supported by a structure mounted within sleeve element 342 and/or a collar or widened portion on rod incapable of passage through opening 352 which thereby supports rod 353 against the upper surface of capping member 351. Rod 353 can have an arcuate portion 354 leading to a hanging loop 355, which can be a partial loop as shown, a full loop, or any other suitable configuration from which to hang functional, decorative, or amusement structures. Illustratively, bird-related implements such as perches, mirrors, figurines, etc., can be supported from rods 353 of system 350.

Figure 32:
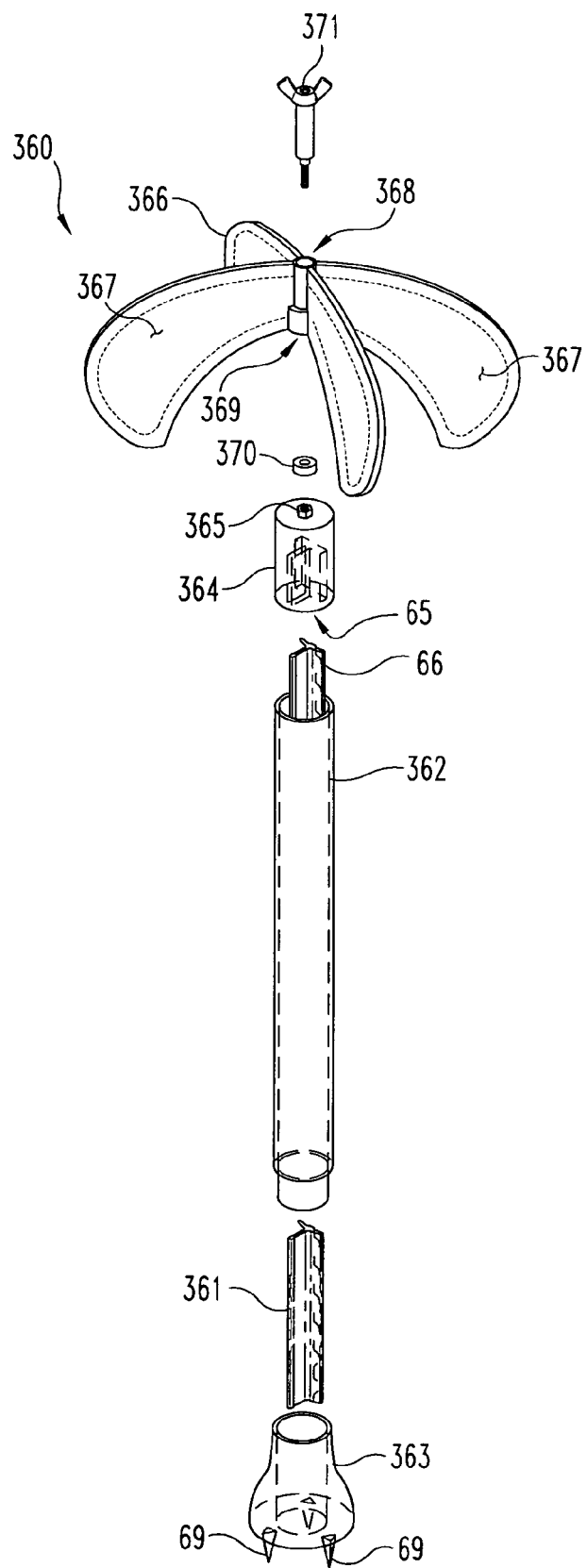
FIG. 32 illustrates a post-mounted wind-driven spinner system of the invention.

FIG. 32 illustrates a T-post mounted advertising spinner system 360 of the invention. Spinner system 360 includes a ground-mounted T-post 361, a sleeve 362, and a footer element 363 similar to those described hereinabove. Spinner system 360 includes a capping element 364 having a threaded nut 365 connected to a top surface thereof (e.g. being integral or bonded to the top surface). A spinning element 366 is provided having a plurality of fins or sails 367 for imparting a spinning motion when impinged by wind or another moving air stream. A press-fit bearing 370 is received within larger portion 369 of central bore 368 to provide smooth rotation of the spinning element. A wing bolt 371 with a threaded lower portion extends through central bore 368 and bearing 370 and is threaded into nut 365 (but no so as to frictionally bear upon the upper surface of spinning element 366 in a fashion that would prevent rotation) to secure the spinning element 366 to capping element 364.

Figure 33:
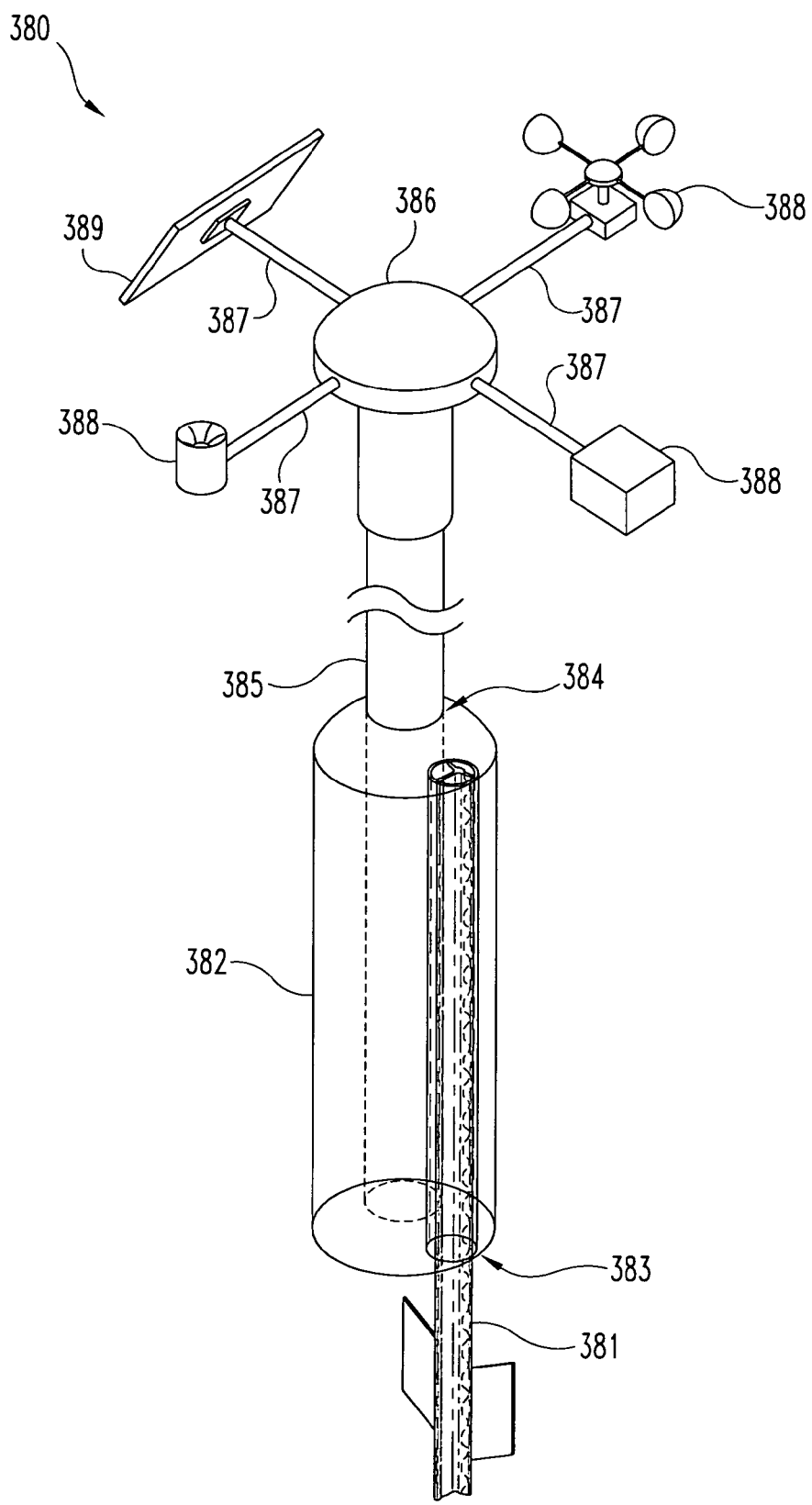
FIG. 33 illustrates one embodiment of a T-post supported pole mounting system of the invention.

With reference to FIG. 33, shown is a pole mounting system 380 of the invention. Pole mounting system 380 includes a T-post 381 and a sleeve element 382 received thereon. Sleeve element 382 includes a first internal channel 383 configured for receipt of T-post 381, desirably in a close or friction fit to prevent substantial lateral movement of the sleeve element 382 relative to the T-post 381. In the illustrated embodiment, first channel 383 is offset to one side of a central axis of sleeve element 382. Sleeve element 382 defines a second channel 384 generally along its central axis. Received within second channel 384 is a long pole 385 extending through channel 384, out a top opening in sleeve element 382, and vertically therefrom a distance. Mounted at the top of pole 385 is a mount structure 386 having a plurality of lateral arms 387 for mounting instruments 388, e.g. weather-related gauges such as rain gauges, temperature gauges, wind gauges, etc. In the illustrated embodiment, a solar panel 389 is mounted upon one of lateral arms 387, for powering other instruments mounted upon the mount structure 386. Appropriate wiring can be provided in mount structure 386 for distributing his power to the instruments. As well, a battery or other energy storage structure can be provided in or on mount structure 386, to store energy generated by solar panel 389. Instruments 388 can be configured to wirelessly transfer data to a remote receiver for display, e.g. a receiver located within a nearby home or other building structure.

Figure 34:
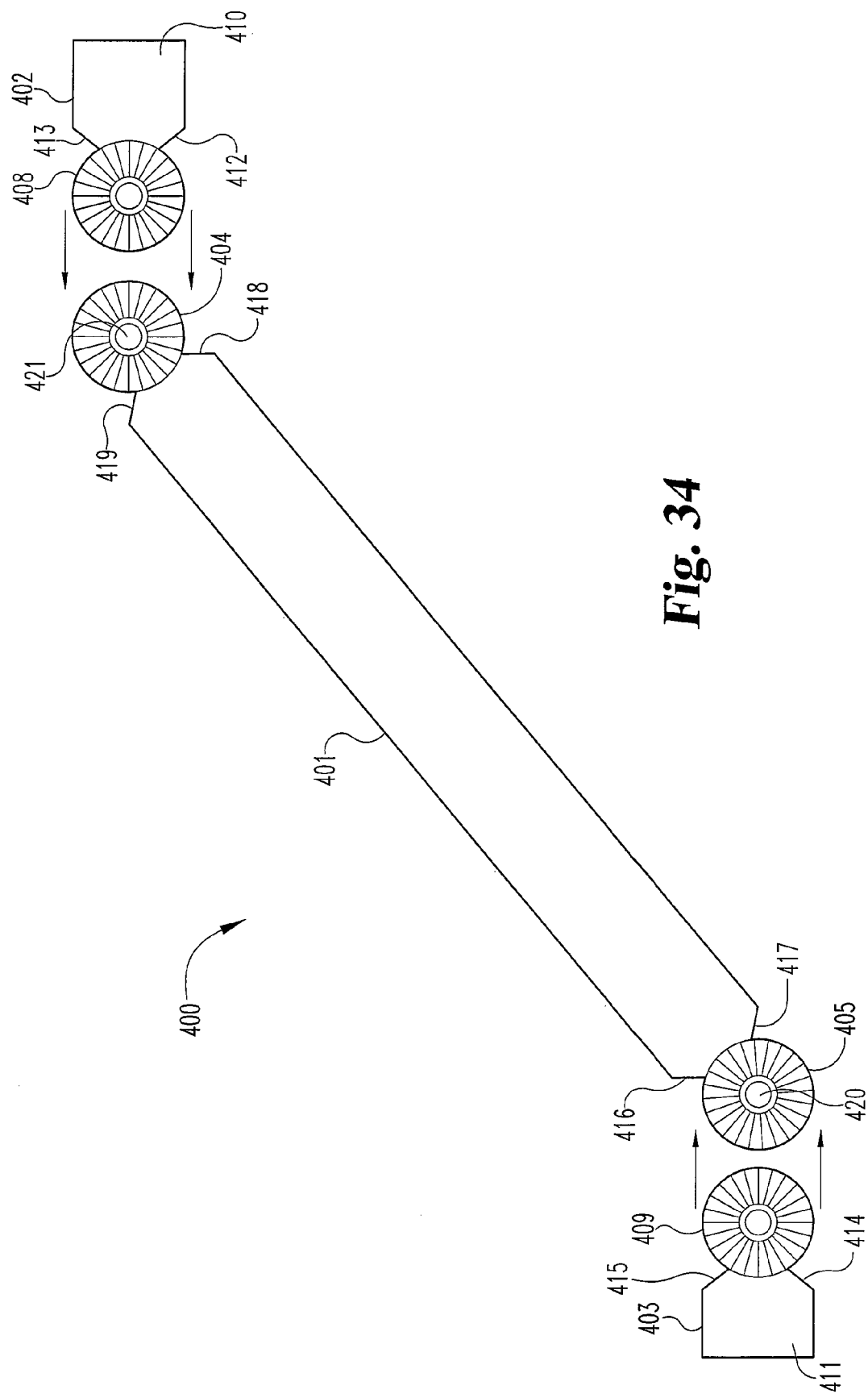
FIG. 34 and FIG. 35 illustrate an embodiment of a variable-angle crossboard that can be used in fencing systems of the invention.
Figure 35:
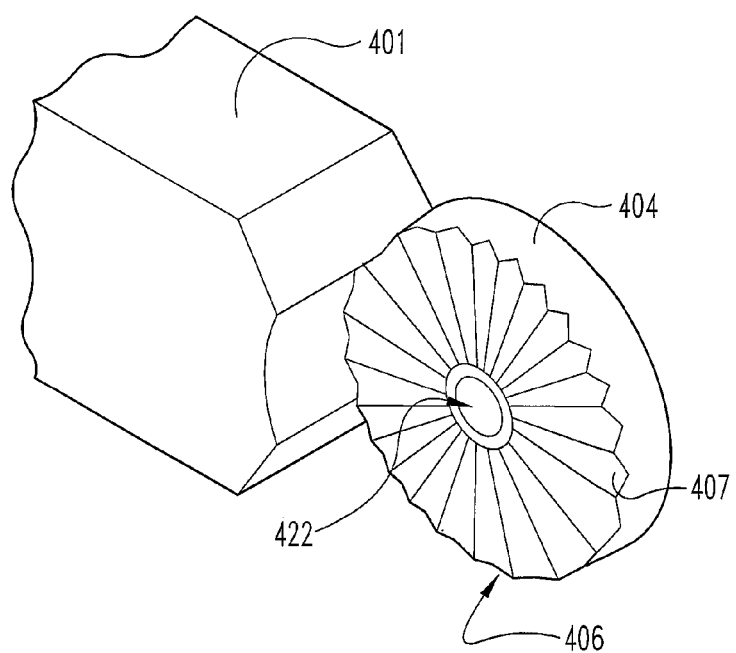

With reference to FIGS. 34 and 35, illustrated in an exploded view is an embodiment of a variable-angle crossboard that can be used in T-post-supported or other post-supported fencing systems as disclosed herein. In particular, crossboard 400 is configured with a central portion 401 and end pieces 402 and 403 that can be adjusted and then securely fixed at various positions relative to one another, for example to define varying angles between end pieces 402 and 403 and central portion 401. This may be used, for example, when fencing along a non-level grade such as a hill using a fencing system with posts as described in FIGS. 20-26. In this fashion, central portion 401 of crossboard 400 can be adjusted to substantially match the grade of the terrain while end pieces 402 and 403 can be positioned substantially at horizontal level for secure attachment to the posts between which crossboard 400 spans (e.g. for receipt of end pieces 402 and 403 within slots 249 of FIGS. 20-23 or into correspondingly shaped receivers such as receivers 285 of FIG. 26).

With continued reference to FIGS. 34 and 35, central portion 401 includes end portions 404 and 405, respectively, each of which includes an inner face 406 having a plurality of radially-extending ridges or teeth 407 which can be overlapped with and mesh and interlock with corresponding ridges or teeth on end portions 408 and 409 of end pieces 402 and 403, respectively. The outermost portions 410 and 411 of end pieces 402 and 403 can thereby be rotatably adjusted relative to central portion 401 to achieve a desired angle, and then the teeth or ridges on portions 404 and 408 and on portions 405 and 409 can be caused to securely intermesh and lock together to stably position the crossboard 400 in the desired configuration. In the illustrated embodiment, end portions 404, 405, 408, and 409 have a generally rounded external profile, although other configurations are possible. Additionally, in the illustrated embodiment, end portions 402 and 403 have beveled wall portions 412, 413, 414, and 415 adjacent their respective rounded end portions, which can serve to provide additional rotational freedom in the crossboard 400. Similarly, central portion 401 includes beveled walls 416, 417, 418, and 419 adjacent its rounded end portions 404 and 405, which can serve to provide additional rotational freedom. Bolts 420 and 421 can extend through apertures 422 in end portions 404 and 408 in an overlapped condition, and 405 and 409 in an overlapped condition, respectively, and receive a correspondingly threaded nut on the opposite side (not shown) to secure the meshing faces (e.g. 406, FIG. 35) together to stably position the crossboard 400 in its desired configuration. It will be understood, however, that other devices or means for securing the meshing faces against one another can also be used.

In use, a plurality of crossboards 400 can be provided and secured between posts in regions of fence row covering a non-level grade. On the other hand, in regions of that fence row that are on level grade, differing crossboards such as those otherwise disclosed herein may optionally be used.

Figure 36:
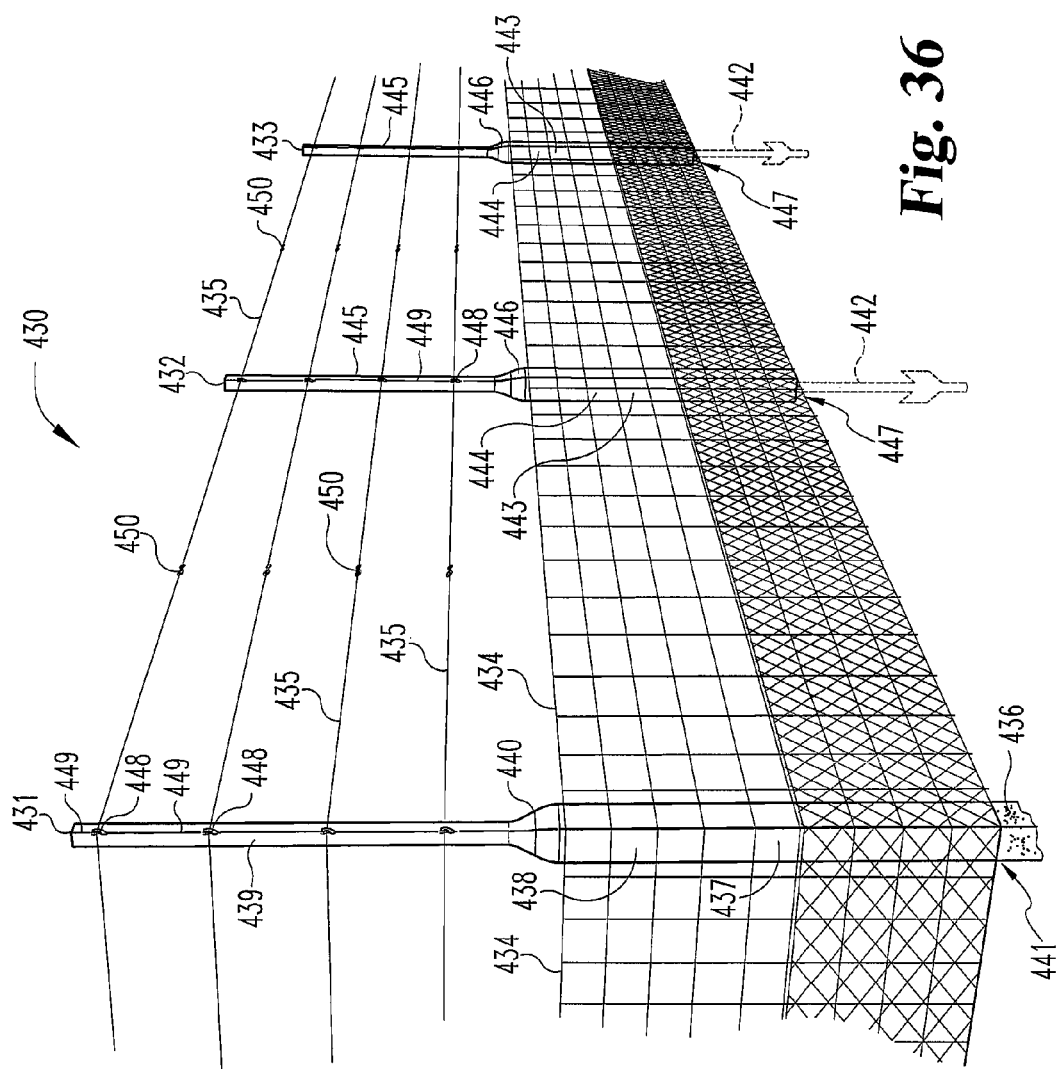
FIGS. 36-38 illustrate a barricade fencing system of the invention.
Figure 37:
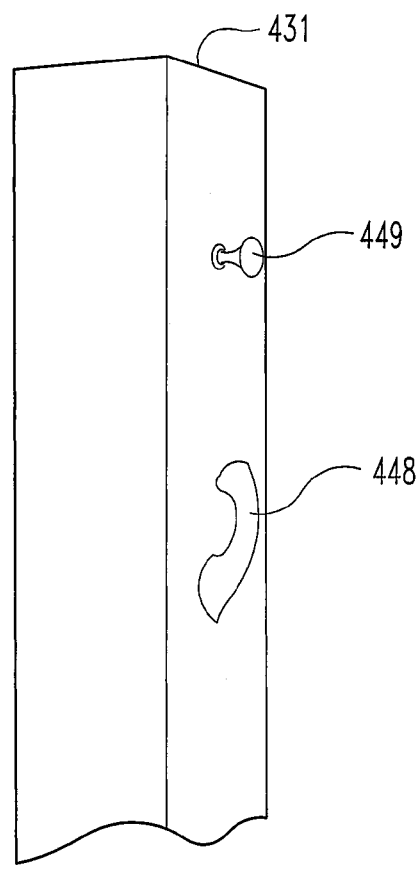
Figure 38:
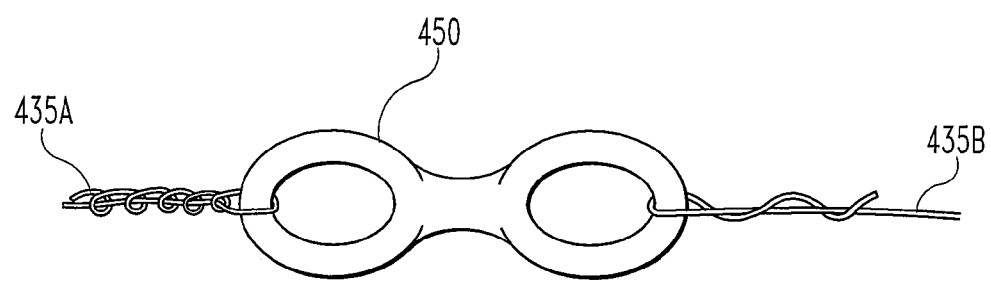

With reference now to FIGS. 36-38, shown are features of a fence barricade system 430 of the invention. System 430 includes a plurality of post structures 431, 432, and 433. In a lower region of the post structures, a wire mesh 434 or other preferably flexible fence barrier material is supported between the posts under relatively high tension. In an upper region of the posts, a wire, tape, or other preferably flexible elongate material is strung between the posts under a relatively low tension. In the illustrated embodiment, post 431 is a corner post and includes a post 436, such as a wooden or metal post, received into the ground and optionally embedded in concrete. Post 436 and a corresponding opposite corner post, or one or more intermediate posts, are secured with sufficient lateral stability to support the fencing material 434 under a relatively high tension. Post structure 431 also includes post sleeve 437 defining an inner void 441 for receipt over post 436 secured in the ground. Post sleeve 437 includes a relatively wider external profile 438 in the lower portion thereof, e.g. in a region defining the internal void, and an upper region 439 having a relatively smaller external profile. Upper region 439 is desirably but not necessarily solid in cross section. A transition zone 440 is located between lower region 438 and upper region 439, and has an external profile of varying size to transition from region 438 to region 439.

Other post structures in the fence barricade system, e.g. posts 432 and 433 in the illustrated embodiment, are supported by T-posts 442 driven into the ground and received within post sleeve elements 443. Post sleeve elements 443, similar to sleeve element 437, include a relatively larger external profile 444 in a lower region thereof, and a relatively smaller external profile region 445 in an upper region thereof. A transition zone 446 is also similarly provided. Post sleeves 443 include an internal defined void 447 for receiving the upper portion of the T-posts 442. The internal void can have any suitable configuration for securement over T-post 442, including for example any of those disclosed hereinabove, or others. Upper regions of post sleeves 437 and 443 define adaptations for holding the low-tension fencing material. With particular reference to FIG. 37, these can include clasps 448 into which wire or other fencing material can be inserted and/or tabs 449 which can be inserted into corresponding slits or openings in fencing materials such as tapes. The lower portions of the post sleeves can include similar adaptations such as clasps or tabs for facilitating holding the higher tension fencing material. To protect against breakage or other damage to the upper regions of posts 431-433 due to falling trees or other impingements, the upper fencing material 435 can have predetermined weakened zones at which the fencing material 435 will break or otherwise separate when subjected to a force that would damage the posts. In the illustrated embodiment, as best shown in the enlarged view of FIG. 38, a double-eye connector 450 connects a first wire or other fencing portion 435A and a second wire or other fencing portion 435B. The connection between fencing portions 435A and 435B is of such a nature as to break or separate when subjected to a damaging force, e.g. in the illustrated embodiment wherein wire portions are threaded through the eyes of connector 450, doubled back and twisted upon themselves. It will be understood that other breakaway arrangements are also suitable.

In use, the fencing barricade system shown in FIGS. 36-38 can be used to contain animals for which high barriers are necessary, e.g. deer, or to restrain those animals from entering certain areas. Fencing system 430 can be erected with relative ease, requiring relatively fewer posts with sufficient lateral stability to support tensioned fencing material, with intervening posts supported on T-posts that are sufficient to support the vertical fence load, but need not possess the same lateral stability or load capacity as the other posts.

Figure 39:
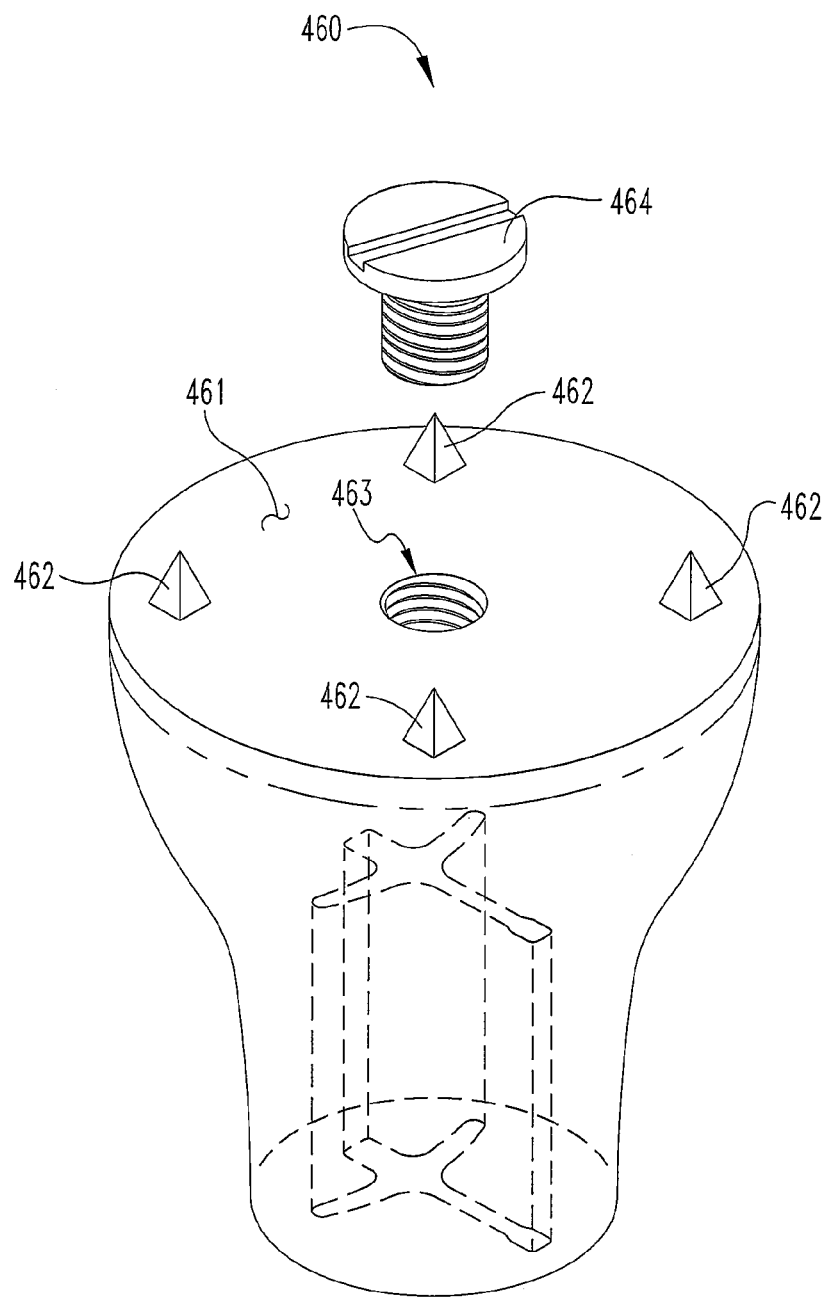
FIG. 39 provides a perspective view of an alternate mount plate for receipt atop a T-post.

FIG. 39 provides a perspective view of another mount plate for receipt atop a T-post. Mount plate 460 includes an upwardly-facing bearing surface 461 and a plurality of penetrating elements 462 for penetrating the material of an object to be mounted atop mount plate 460. Penetrating elements 462 as shown in the drawing are generally pyramidal-shaped teeth; however, it will understood that other penetrating element configurations including spikes, pins, and the like, can also be used. Mount plate 460 also includes a threaded bore 463 in the upper surface 461 thereof, which can threadedly engage a bolt 464 or other connector. In use, an implement such as a birdhouse having a wooden, foam, or other penetrable lower member can be pressed downwardly upon penetrating elements 462 such that elements 462 penetrate the lower member and secure the same against rotation and potentially other movement. Bolt 464 can be passed through an opening in the lower member of the birdhouse or other implement to be mounted and threaded into bore 463 to secure the implement atop the mount plate 460.

T-Posts and other components of embodiments of the invention can be made from any suitable materials, including for example metals and/or plastics. In certain embodiments, footing elements, sleeve elements, capping elements, crossboards, fencing panels, and other similar elements described herein are made of tough plastic materials. Especially in the case of elements used for fencing, but also potentially other elements, a reinforced plastic material is used, such as fiberglass or wood fiber reinforced plastics. The polymeric material in the plastics can be any suitable material including for instance polyvinyl chlorides (PVC), polyesters, polyethers, polystyrenes, natural or synthetic rubbers, polyolefins, or copolymers of these or any other suitable polymer material. The elements formed of these plastics material can carry surface patterning and/or pigment, e.g. a wood grain surface pattern in the case of fencing or other components described herein. These and other variations will be apparent to those of ordinary skill in the art from the descriptions herein.

It will be appreciated that a variety of inventive embodiments are encompassed within the structures set out in FIGS. 1 through 39 above. However, it should be understood that the inventive embodiments disclosed herein are not limited to the specific, disclosed structures. For example, in one aspect, the present invention provides a capping accessory for receipt atop an underlying T-post, which mates with the T-post via a defined internal opening in the shape of a T-post. In such embodiments, in the region defining the internal opening, the capping member benefits by having a solid cross-section apart from the defined T-post-shaped opening. In this fashion, a sturdy, long-lasting structure is provided.

In other aspects, T-post mounted accessories of the invention are provided as multi-purpose mounting structures, with either horizontal or vertical bearing surfaces against which secondary accessories can be mounted using mounting apertures defined in the bearing surfaces. Additional inventive aspects disclosed herein involve the use of multiple associated T-posts, such as dual T-post structures, to provide a more robust post element for use in supporting any of a variety of T-post mounted accessories as disclosed herein.

Still further aspects broadly involve T-post mounted accessories which are suited to support adjacent objects such as trees, or to receive ropes or wires which can be used in multiples to cordon off areas. Still further embodiments relate broadly to fencing systems having posts supported by T-posts, and cross boards extending between the T-posts. Such systems can be rapidly and inexpensively installed, for example as residential fences, horse fences, commercial fences, and the like. The use of dual T-post assemblies in fence structures such as those disclosed creates a sturdier, longer-lasting structure. As well, the use of T-post reinforced cross boards strengthens such fences.

In other aspects, novel systems and assemblies are provided which can use T-posts or other posts as support structures. Illustratively, in certain embodiments, post-supported structures include a capping element received atop the post, a sleeve, and a footing element. These elements can mate to cover and preferably conceal the T-post or other post structure of the assembly. In still further embodiments, accessory mounting systems can utilize posts or wall-mount features, desirably in such situations wherein the accessory is a birdhouse. In addition, birdhouse mounting systems which provide for a removable mount of the birdhouse to a wall or a T-post or other post structure are provided which include first and second mounting elements that cooperate with one another for the removable mount. In favored designs, cooperation is achieved through corresponding trapazoidally shaped wedges and openings which provide a secure gravity mount of accessories such as birdhouses.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A multi-purpose mount assembly, comprising:
   a T-post; and
   a mount accessory mounted atop the T-post, said mount accessory defining an internal void in which a portion of the T-post is received, wherein said internal void is shaped as a negative of a top end of the T-post and is configured to frictionally engage the T-post;
   said mount accessory including an upwardly-facing bearing surface defining a plurality of threaded apertures; and
   wherein said internal void extends upwardly and only partially through said mount accessory so as to terminate within said mount accessory below said upwardly-facing bearing surface.

2. The mount assembly of claim 1, also comprising an implement mounted atop said bearing surface.

3. A durable T-post mounted accessory, comprising:
a T-post; and
an accessory mounted atop the T-post;
said accessory including an accessory body defining an internal void extending only partially through the accessory body and shaped to correspond and frictionally mate with the T-post;
said accessory body having a solid cross-section between said void and outer surfaces of the body encompassing said void;
said accessory body including a first body portion for mounting on the T-post, the first body portion including said internal void, and said accessory body including a second body portion positioned above the first body portion and internal void, the second body portion defining an upwardly-facing bearing surface having a diameter larger than that of said first body portion.

4. The mounted accessory of claim 3, wherein said upwardly facing bearing surface defines a plurality of apertures.

5. The mounted accessory of claim 4, wherein said internal void has a generally triangular shape in cross section, and wherein said internal void extends only partially through said accessory body from an opening on a bottom surface of said accessory body.

6. The mounted accessory of claim 4, wherein said internal void is shaped as a negative of a top end of the T-post, and wherein said internal void extends only partially through said accessory body from an opening on a bottom surface of said accessory body.

7. A post assembly, comprising:
an internal post structure;
a cap accessory received atop the post structure;
a sleeve accessory contacting said cap accessory and received over an intermediate portion of said internal post structure; and
a footing accessory contacting said sleeve accessory and received over and surrounding a lower portion of said internal post structure, the footing accessory including a body for surrounding the lower portion of the internal post structure and least one protrusion for ground-penetration to secure a position of the footing accessory, said at least one protrusion being integral with said body.

8. The post assembly of claim 7, wherein said internal post structure comprises a T-post.

9. The post assembly of claim 7, wherein said at least one protrusion is a spike.

10. The post assembly of claim 7, wherein said cap accessory defines an internal void for receipt of an upper end of said internal post structure.

11. The post assembly of claim 7, wherein said cap accessory is a mount accessory.

12. The post assembly of claim 11, wherein said mount accessory includes a bearing surface defining apertures.

13. The post assembly of claim 7, wherein said sleeve accessory comprises at least one opening configured to receive and support a laterally-extending cross board.

14. An assembly for supporting an adjacent object, the assembly comprising:
a T-post;
a top-mounted accessory on said T-post;
said top-mounted accessory including a mount body defining an internal void received over and frictionally engaging an upper region of said T-post;
said top-mounted accessory including a lateral arm connected to said mount body and extending transversely to said T-post;
a receiver element connected at an end of said lateral arm and defining a region for receipt against the adjacent object without completely surrounding the adjacent object with the receiver element; and
a secondary element cooperable with said receiver element to completely surround the adjacent object.

15. A T-post supported fence structure, comprising:
first and second T-post structures spaced from one another;
first and second sleeve elements received over said first and second T-post structures, respectively, said first and second sleeve elements each having a vertical face defining an opening; and
at least one cross-board element extending completely between said first and second sleeve elements and having a first end received within the opening defined in the vertical face of the first sleeve element so as to be supported by said first sleeve element and a second end received within the opening defined in the vertical face of the second sleeve element so as to be supported by said second sleeve element.

16. The fence structure of claim 15, wherein said first and second T-post structures each include a plurality of T-posts.

17. The fence structure of claim 15, wherein said openings each have an inclined upper surface.

18. The fence structure of claim 15, also comprising first and second cap accessories mounted atop said first and second T-post structures, respectively.

19. The fence structure of claim 18, also comprising first and second footing accessories received over said first and second T-post structures, respectively.

20. A supported implement, comprising:
a vertical post structure including first and second T-posts confined in an overlapping condition, the first and second T-posts including respective first and second upper ends, wherein the first and second upper ends are vertically co-aligned;
an implement attached to said vertical post structure, wherein said implement comprises a cap accessory received over said vertically co-aligned first and second upper ends; and
wherein the cap accessory has an internal void sized to frictionally engage said vertically co-aligned first and second upper ends.

21. The supported implement of claim 20, wherein the implement comprises a fence structure.

22. The supported implement of claim 20, wherein said cap accessory comprises a mailbox.

23. The supported implement of claim 20, wherein said cap accessory comprises a birdhouse.

24. The supported implement of claim 20, wherein said cap accessory comprises a mount accessory having a bearing surface.

25. A post mounting system, comprising:
a post structure having an upper end;
a first mount element received against the upper end and extending above said post structure, said first mount element defining an internal void extending only partially through said first mount element, with the upper end of the post structure received in the internal void; and
a second mount element cooperable for reversible attachment to said first mount element; and
said second mount element including a bearing face for contact with an implement to be mounted; and apertures defined in said bearing face for receiving fasteners.

26. The system of claim 25, also comprising an implement received against and mounted to said bearing face.

27. The system of claim 26, wherein said implement comprises a birdhouse.

28. A pole mounting system, comprising:
   a post structure received in the ground so as to extend beneath a surface of the ground;
   a sleeve structure defining a first void, said post structure received in said first void;
   said sleeve structure also defining a second void;
   an upstanding pole received in said second void, the upstanding pole having a lowermost end received against the surface of the ground;
   at least one implement mounted to said pole, wherein said implement comprises a solar panel; and
   wherein the sleeve structure has a central axis, and wherein said second void is a channel generally aligned with said central axis and said first void is a channel offset from said central axis.

29. The pole mounting system of claim 28, also comprising a second implement mounted to said pole, wherein said second implement comprises a mount structure for at least one weather-related instrument.

30. The pole mounting system of claim 28, wherein said post structure comprises at least one T-post.

31. A post mounting system, comprising:
   (a) a post structure including:
      (i) a post having a cross-sectional shape including three or more outwardly-extending arms, said outwardly-extending arms each having an outermost arm surface;
      (ii) a sleeve element received over said post, said sleeve element including an internal cylindrical void sized and shaped such that the sleeve element frictionally engages said outwardly-extending arms only at said outermost arm surfaces;
   (b) a top-mounted element mounted atop said post structure and extending above and covering an upper end of said post.

32. The post mounting system of claim 31, wherein said cylindrical void has a substantially circular cross section.

33. The post mounting system of claim 31, wherein said post is a T-post.

34. The post mounting system of claim 31, wherein said top-mounted element has a void received over an upper portion of said sleeve element.

35. The post mounting system of claim 31, wherein said top-mounted element has a void extending only partially therethrough and configured for frictional engagement of an upper portion of said post.

36. A method for installing a post structure in ground, comprising:
   providing first and second T-posts in an overlapping configuration with respective upper ends of the first and second T-posts vertically co-aligned;
   installing a driving cap over said T-posts, said driving cap defining an internal void for receiving the vertically co-aligned upper ends of said T-posts; and
   applying a driving force to an upper surface of said driving cap to drive said T-posts into the ground in said overlapping configuration with the respective upper ends of the first and second T-posts vertically co-aligned.

37. A post-supported barricade fence structure, comprising:
   at least first and second post structures spaced from one another;
   first and second sleeve elements received over said first and second post structures, respectively, said first and second sleeve elements including upper portions and lower portions;
   a higher tension fencing material attached to and supported between said lower portions of said sleeve elements; and
   a lower tension fencing material attached to and supported between said upper portions of said sleeve elements and extending above said higher tension fencing material, said lower tension fencing material comprising flexible elongate material strung between the first and second posts, and said lower tension fencing material including breakaway points providing weakened zones at which the lower tension fencing material will separate when subjected to a damaging force.

* * * * *